United States Patent
Yang

(10) Patent No.: US 10,555,257 B2
(45) Date of Patent: Feb. 4, 2020

(54) SYSTEM AND METHOD FOR DETECTING AN ERRONEOUS BEACON SIGNAL

(71) Applicant: Futurewei Technologies, Inc., Plano, TX (US)

(72) Inventor: Yunsong Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 98 days.

(21) Appl. No.: 15/977,537

(22) Filed: May 11, 2018

(65) Prior Publication Data
US 2019/0246351 A1  Aug. 8, 2019

Related U.S. Application Data

(60) Provisional application No. 62/626,800, filed on Feb. 6, 2018.

(51) Int. Cl.
*H04W 52/02* (2009.01)
*H04W 72/04* (2009.01)
*H04W 56/00* (2009.01)

(52) U.S. Cl.
CPC ... *H04W 52/0216* (2013.01); *H04W 52/0229* (2013.01); *H04W 52/0238* (2013.01); *H04W 52/0245* (2013.01); *H04W 56/001* (2013.01); *H04W 72/042* (2013.01); *H04W 72/0446* (2013.01)

(58) Field of Classification Search
CPC ......... H04W 52/0213; H04W 52/0229; H04W 52/0238; H04W 52/0245; H04W 72/042; H04W 72/0446; H04W 56/001
See application file for complete search history.

(56) References Cited

U.S. PATENT DOCUMENTS

| | | | |
|---|---|---|---|
| 2005/0018624 A1 | 1/2005 | Meier et al. | |
| 2016/0374019 A1* | 12/2016 | Park | H04W 52/0229 |
| 2017/0280392 A1 | 9/2017 | Segev et al. | |
| 2018/0020410 A1* | 1/2018 | Park | H04W 52/0235 |

(Continued)

FOREIGN PATENT DOCUMENTS

| | | |
|---|---|---|
| CN | 101668044 A | 3/2010 |
| CN | 106604377 A | 4/2017 |
| WO | 2018013279 A1 | 1/2018 |

OTHER PUBLICATIONS

Karvonen, Heikki et al.: "Energy Efficient UWB-WUR Dual-ratio Solution for WBANs," 2017 11th International Symposium on Medical Information and Communication Technology (ISMICT), Feb. 6-8, 2017, p. 5.

(Continued)

*Primary Examiner* — Mewale A Ambaye
(74) *Attorney, Agent, or Firm* — Slater Matsil, LLP

(57) ABSTRACT

A method for operating a station associated with an access node includes receiving one or more wake-up radio (WUR) Beacons, wherein the one or more WUR beacons each comprises timing information and an identifier associated with the access node, and wherein the station is configured to receive WUR Beacons to that a first timing information with a WUR receiver, and reporting, to the access node, information about the one or more WUR Beacons, the information comprising at least one of second timing information, signal quality information, or error information.

38 Claims, 13 Drawing Sheets

(56) References Cited

U.S. PATENT DOCUMENTS

| | | | |
|---|---|---|---|
| 2018/0041961 A1* | 2/2018 | Huang | H04W 52/0229 |
| 2018/0234918 A1* | 8/2018 | Asterjadhi | H04W 52/0216 |
| 2019/0075520 A1* | 3/2019 | Li | H04W 52/0225 |
| 2019/0124596 A1* | 4/2019 | Cao | H04L 5/0053 |

OTHER PUBLICATIONS

Park, et al. "Low-Power Wake-Up Receiver (LP-WUR) for 802.11," IEEE 802.11-15/1307r1, Minyoung Park, Nov. 10, 2015, 18 pages.
Park et al., "LP-WUR (Low-Power Wake-Up Receiver): Enabling Low-Power and Low-Latency Capability for 802.11," IEEE 802.11-16/0027r0, Minyoung Park, Jan. 18, 2016, 21 pages.
Park, et al., "LP-WUR (Low-Power Wake-Up Receiver) Follow-Up," IEEE 802.11-16/0341r0, Minyoung Park, Mar. 2016, 9 pages.
"IEEE Standards for Information technology—Telecommunications and information exchange between systems; Local and metropolitan area networks—Specific requirements; Part 11: Wireless LAN Medium Access Control (MAC) and Physical Layer (PHYS) Specifications," IEEE Computer Society, IEEE Std 802.11™-2016 (Revision of IEEE Std 802.11-2012), Dec. 14, 2016, 3534 pages.
"IEEE Standard for Information technology—Telecommunications and information exchange between systems; Local and metropolitan area networks—Specific requirements; Part 11: Wireless LAN Medium Access Control (MAC) and Physical Layer PHY) Specification; Amendment 2: Sub 1 GHz License Exempt Operation," IEEE Std 802.11ah™-2016 (Amendment to IEEE Std 802.11™-2016 as amended by IEEE Std 802.11ai™-2016), May 5, 2017, 594 pages.

* cited by examiner

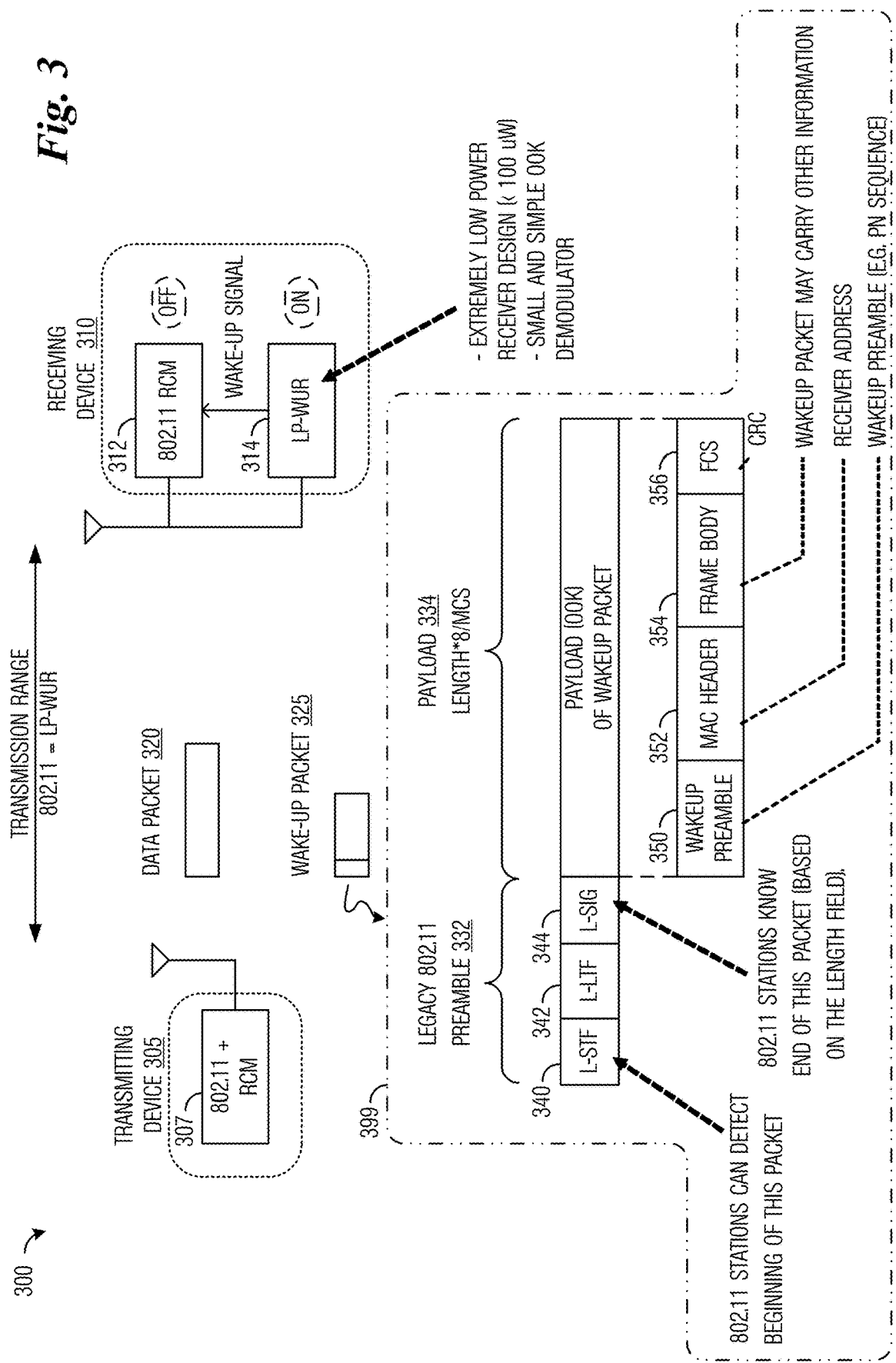

SYSTEM AND METHOD FOR DETECTING AN ERRONEOUS BEACON SIGNAL

This application claims the benefit of U.S. Provisional Application No. 62/626,800, filed on Feb. 6, 2018, entitled "System and Method for Detecting an Erroneous Beacon Signal," which application is hereby incorporated herein by reference in its entirety.

TECHNICAL FIELD

The present disclosure relates generally to a system and method for digital communications, and, in particular embodiments, to a system and method for detecting an erroneous beacon signal.

BACKGROUND

Power consumption is a key consideration in devices that are battery powered. A design criterion for a battery powered device is to minimize power consumption to extend the period of time between battery recharges or replacement as much as possible. In some deployments, such as remotely located sensors, battery replacement may be both impractical as well as expensive. Even in situations where the battery powered device is readily available and recharging is easy, such as in cellular telephones, tablets, laptop computers, wearable devices (WDs), and so on, recharging the battery is still an inconvenient and time consuming task.

Radio communications modules (RCMs), which provide wireless connectivity that is so vital to the operation of these battery powered devices, is also a significant source of power consumption. In general, the more complex the communications or greater range supported by the RCM, the greater the power consumption. A reduction in power consumption is realizable by putting one or more RCMs of a battery powered device into a sleep mode (also referred to as a power off, power saving, power reduced, or inactive mode) when there is no need of data communications while maintaining a simple, low-power wake-up receiver to receive a wake-up packet. The wake-up packet is transmitted by another device to wake up at least one of the one or more RCMs of the battery powered device in order to resume data communications with the battery powered device. The Institute of Electrical and Electronics Engineers (IEEE) 802.11 Working Group has initiated a standard amendment project referred to as the 802.11ba Amendment to standardize such wake-up technique to be added to the 802.11 family of standards.

SUMMARY

Example embodiments provide a system and method for detecting an erroneous beacon signal.

In accordance with an example embodiment, a computer-implemented method for operating a station associated with an access node is provided. The method includes receiving, by the station, one or more wake-up radio (WUR) Beacons, wherein the one or more WUR beacons each comprises timing information and an identifier associated with the access node, and wherein the station is configured to receive WUR Beacons with a WUR receiver, and reporting, by the station to the access node, information about the one or more WUR Beacons, the information comprising at least one of second timing information, signal quality information, or error information.

Optionally, in any of the preceding embodiments, further including receiving, by the station, a configuration message specifying a configuration, and configuring, by the station and based on the configuration, the station to receive the one or more WUR Beacons and report the information about the one or more WUR Beacons, wherein the configuration message includes the identifier associated with the access node.

Optionally, in any of the preceding embodiments, wherein the configuration message further includes at least one of: an operating band where the one or more WUR Beacons are transmitted, an operating channel where the one or more WUR Beacons are transmitted, a monitoring time, a monitoring duration, a monitoring start time, a monitoring stop time, a reporting time, a reporting frequency, a reporting interval, an event that triggers a report, or a maximal number of WUR Beacons to be reported.

Optionally, in any of the preceding embodiments, further including transmitting, by the station in response to receiving the configuration message, a response message including information conveying that the station accepts the configuration in the configuration message.

Optionally, in any of the preceding embodiments, wherein the information about the one or more WUR Beacons comprises at least one of: first timer values obtained from second timer values included in the one or more WUR Beacons, third timer values obtained from a timer of the station when the one or more WUR Beacons are received, respectively, reception time interval values for reception time intervals between consecutive WUR Beacons of the one or more WUR Beacons, signal quality measures associated with the one or more WUR Beacons, or an error indication conveying that the one or more WUR Beacons are erroneous WUR Beacons.

Optionally, in any of the preceding embodiments, wherein the first timer values and the second timer values are the same.

Optionally, in any of the preceding embodiments, wherein the first timer values are the second timer values appended with one or more higher significant bits above bits associated with the second timer values, the one or more higher significant bits are obtained from a timer of the station and adjusted when an occurrence of a roll over in a second timer value is detected by the station.

Optionally, in any of the preceding embodiments, further including determining, by the station, the reception time interval values for the one or more WUR Beacons in accordance with the third timer values associated with respective consecutive WUR Beacons of the one or more WUR Beacons.

Optionally, in any of the preceding embodiments, further including measuring, by the station, the signal quality of the one or more WUR Beacons, wherein a signal quality measure comprises at least one of a received signal strength indication (RSSI), a signal to noise ratio (SNR), or a signal to noise plus interference ratio (SINR).

Optionally, in any of the preceding embodiments, wherein the one or more WUR Beacons are erroneous WUR Beacons determined by the station, and wherein the method further includes determining, by the station, that the one or more WUR Beacons are erroneous WUR Beacons in response to at least one of: detecting two or more equal second timer values included in the one or more WUR Beacons; detecting a difference between a reception time interval between a consecutive WUR Beacon pair of the one or more WUR Beacons and a transmission time interval between the consecutive WUR Beacon pair exceeding a threshold, wherein the reception time interval is determined in accordance with the third timer values associated with the consecutive WUR Beacon pair, and wherein the transmission time interval is determined in accordance with the second timer values included in the consecutive WUR Beacon pair; or detecting a difference between a signal quality measure associated with the one or more WUR Beacons and signal quality measures associated with other received WUR Beacons identified by the identifier associated with the access node exceeding a threshold, thereby producing the error indication conveying that the one or more WUR Beacons are erroneous WUR Beacons.

Optionally, in any of the preceding embodiments, further including determining, by the station for each of the one or more WUR Beacons, an error type in accordance with the at least one of the detections associated with the each of the one or more WUR Beacons, and including, by the station, at least one of the error types associated with the one or more WUR Beacons or numbers conveying instances of respective error types associated with the one or more WUR Beacons in the error information reported to the access node.

Optionally, in any of the preceding embodiments, further including receiving, by the station prior to reporting the information about the one or more WUR Beacons, a first frame requesting the reporting of the information about the one or more WUR Beacons.

Optionally, in any of the preceding embodiments, wherein reporting the information about the one or more WUR Beacons comprises transmitting, by the station, a second frame including the information about the one or more WUR Beacons.

Optionally, in any of the preceding embodiments, wherein the second frame further conveys a number of the one or more WUR Beacons reported in the second frame, and wherein the information about the one or more WUR Beacons is included in the second frame in an order that the one or more WUR Beacons are received.

Optionally, in any of the preceding embodiments, wherein the one or more WUR Beacons are received using a WUR receiver of the station, and wherein the information about the one or more WUR Beacons is reported using a radio communications module (RCM) of the station, wherein the WUR receiver of the station has a radio-frequency (RF) channel bandwidth narrower than that of the RCM of the station.

In accordance with an example embodiment, a computer-implemented method for operating an access node is provided. The method includes receiving, by the access node from a station associated with the access node, a report comprising information about one or more first WUR Beacons, wherein the one or more first WUR Beacons are identified by an identifier associated with the access node, and wherein the information about the one or more first WUR Beacons comprises at least one of timing information, signal quality information, or error information about the one or more first WUR Beacons, detecting, by the access node, an erroneous WUR Beacon in accordance with the received information about the one or more first WUR Beacons, and entering, by the access node, a secured operating mode in response to detecting the erroneous WUR Beacon.

Optionally, in any of the preceding embodiments, further including transmitting, by the access node to the station, a configuration message specifying a configuration to configure the station to receive the one or more first WUR Beacons and report the information about the one or more first WUR Beacons, wherein the configuration message includes the identifier associated with the access node.

Optionally, in any of the preceding embodiments, wherein the configuration message further specifies at least one of: an operating band where the one or more first WUR Beacons are transmitted, an operating channel where the one or more first WUR Beacons are transmitted, a monitoring time, a monitoring duration, a monitoring start time, a monitoring stop time, a reporting time, a reporting frequency, a reporting interval, an event that triggers a report, or a maximal number of WUR Beacons to be reported.

Optionally, in any of the preceding embodiments, further including receiving, by the access node from the station, a response message including information conveying that the station accepts the configuration in the configuration message.

Optionally, in any of the preceding embodiments, wherein the received information about the one or more first WUR Beacons comprises at least one of: first timer values obtained by the station from the one or more first WUR Beacons, second timer values obtained from a timer of the station when the one or more first WUR Beacons are received by the station, respectively, reception time interval values for reception time intervals between consecutive WUR Beacons of the one or more first WUR Beacons, signal quality measures associated with the one or more first WUR Beacons, or an error indication conveying that the one or more first WUR Beacons are erroneous WUR Beacons.

Optionally, in any of the preceding embodiments, wherein detecting the erroneous WUR Beacon in accordance with the received information comprises detecting two or more equal reported first timer values in the received information.

Optionally, in any of the preceding embodiments, further including transmitting, by the access node, one or more second WUR Beacons including the identifier associated with the access node, each of the one or more second WUR Beacons further including a third timer value obtained from a timer of the access node when the each of the one or more second WUR Beacons is transmitted, and storing, by the access node, the third timer values of the one or more second WUR Beacons transmitted, wherein detecting the erroneous WUR Beacon in the received information comprises detecting a reported first timer value of a first WUR Beacon that doesn't match with any stored third timer values of the one or more second WUR Beacons.

Optionally, in any of the preceding embodiments, wherein detecting the erroneous WUR Beacon in accordance with the received information comprises detecting a difference between a reception time interval between a consecutive first WUR Beacon pair and a transmission time interval between the same consecutive first WUR Beacon pair exceeding a threshold, the transmission time interval is determined in accordance with the stored third timer values associated with the consecutive first WUR Beacon pair.

Optionally, in any of the preceding embodiments, further including determining, by the access node, the reception time intervals for the one or more first WUR Beacons in accordance with the second timer values associated with the one or more first WUR Beacons in the received information.

Optionally, in any of the preceding embodiments, wherein detecting the erroneous WUR Beacon in accordance with the received information comprises detecting a difference between a signal quality measure associated with a first WUR Beacon reported and signal quality measures associated with other first WUR Beacons reported exceeding a threshold.

Optionally, in any of the preceding embodiments, wherein detecting the erroneous WUR Beacon in accordance with the received information comprises detecting the error indication conveying that the one or more first WUR Beacons are erroneous WUR Beacons.

Optionally, in any of the preceding embodiments, further including transmitting, by the access node to the station prior to receiving the information about the one or more first WUR Beacons, a first frame requesting a reporting of the information about the one or more first WUR Beacons.

Optionally, in any of the preceding embodiments, wherein the first frame further includes information conveying a maximal number of the one or more first WUR Beacons to be reported.

Optionally, in any of the preceding embodiments, wherein the access node is configured to transmit one or more second WUR Beacons having a radio-frequency (RF) signal bandwidth narrower than that of a signal carrying the report, while the access node is not in the secured operating mode.

Optionally, in any of the preceding embodiments, wherein the access node is configured to transmit no second WUR Beacons while in the secured operating mode.

In accordance with an example embodiment, a station is provided. The station includes a memory storage comprising instructions, and one or more processors in communications with the memory storage. The one or more processors execute the instructions to receive one or more WUR Beacons, wherein the one or more WUR beacons each comprises timing information and an identifier associated with an access node, and wherein the station is configured to receive WUR Beacons with a WUR receiver, and report, to the access node, information about the one or more WUR Beacons, the information comprising at least one of second timing information, signal quality information, or error information.

Optionally, in any of the preceding embodiments, wherein the one or more processors further execute the instructions to receive a configuration message specifying a configuration, and configure, based on the configuration, the station to receive the one or more WUR Beacons and report the information about the one or more WUR Beacons, wherein the configuration message includes the identifier associated with the access node.

Optionally, in any of the preceding embodiments, wherein the one or more processors further execute the instructions to transmit, in response to receiving the configuration message, a response message including information conveying that the station accepts the configuration in the configuration message.

Optionally, in any of the preceding embodiments, wherein the information about the one or more WUR Beacons comprises at least one of: first timer values obtained from second timer values included in the one or more WUR Beacons, third timer values obtained from a timer of the station when the one or more WUR Beacons are received, respectively, reception time interval values for reception time intervals between consecutive WUR Beacons of the one or more WUR Beacons, signal quality measures associated with the one or more WUR Beacons, or an error indication conveying that the one or more WUR Beacons are erroneous WUR Beacons.

Optionally, in any of the preceding embodiments, wherein the one or more processors further execute the instructions to determine the reception time interval values for the one or more WUR Beacons in accordance with the third timer values associated with respective consecutive WUR Beacons of the one or more WUR Beacons.

Optionally, in any of the preceding embodiments, wherein the one or more processors further execute the instructions to measure the signal quality of the one or more WUR Beacons, wherein a signal quality measure comprises at least one of a received signal strength indication (RSSI), a signal to noise ratio (SNR), or a signal to noise plus interference ratio (SINR).

Optionally, in any of the preceding embodiments, wherein the one or more WUR Beacons are erroneous WUR Beacons determined by the station, and wherein the one or more processors further execute the instructions to determine that the one or more WUR Beacons are erroneous WUR Beacons in response to at least one of: two or more equal second timer values included in the one or more WUR Beacons are detected; a difference between a reception time interval between a consecutive WUR Beacon pair of the one or more WUR Beacons and a transmission time interval between the consecutive WUR Beacon pair exceeding a threshold is detected, wherein the reception time interval is determined in accordance with the third timer values associated with the consecutive WUR Beacon pair, and wherein the transmission time interval is determined in accordance with the second timer values included in the consecutive WUR Beacon pair; or a difference between a signal quality measure associated with the one or more WUR Beacons and signal quality measures associated with other received WUR Beacons identified by the identifier associated with the access node exceeding a threshold is detected, thereby producing the error information conveying that the one or more Beacons are erroneous Beacons.

Optionally, in any of the preceding embodiments, wherein the one or more processors further execute the instructions to determine, for each of the one or more WUR Beacons, an error type in accordance with the at least one of detections associated with the each of the one or more WUR Beacons, and include at least one of the error types associated with the one or more WUR Beacons or numbers conveying instances of respective error types associated with the one or more WUR Beacons in the error information reported to the access node.

Optionally, in any of the preceding embodiments, wherein the one or more processors further execute the instructions to receive, prior to reporting the information about the one or more WUR Beacons, a first frame requesting the reporting of the information about the one or more WUR Beacons.

Optionally, in any of the preceding embodiments, further including a WUR receiver in communications with the one or more processors and configured to receive the one or more WUR Beacons, and a RCM in communications with the one or more processors and configured to transmit the information about the one or more WUR Beacons to the access node, wherein the WUR receiver has a RF channel bandwidth narrower than that of the RCM.

In accordance with an example embodiment, an access node is provided. The access node includes a memory storage comprising instructions, and one or more processors in communications with the memory storage. The one or more processors execute the instructions to receive, from a station associated with the access node, a report comprising information about one or more first WUR Beacons, wherein the one or more first WUR Beacons are identified by an identifier associated with the access node, and wherein the information about the one or more first WUR Beacons comprises at least one of timing information, signal quality information, or error information about the one or more first WUR Beacons, detect an erroneous WUR Beacon in accordance with the received information about the one or more first WUR Beacons, and enter a secured operating mode in response to detecting the erroneous WUR Beacon.

Optionally, in any of the preceding embodiments, wherein the one or more processors further execute the instructions to transmit, to the station, a configuration message specifying a configuration to configure the station to receive the one or more first WUR Beacons and to report the information about the one or more first WUR Beacons, wherein the configuration message includes the identifier associated with the access node.

Optionally, in any of the preceding embodiments, wherein the configuration message further specifies at least one of: an operating band where the one or more first WUR Beacons are transmitted, an operating channel where the one or more first WUR Beacons are transmitted, a monitoring time, a monitoring duration, a monitoring start time, a monitoring stop time, a reporting time, a reporting frequency, a reporting interval, an event that triggers a report, or a maximal number of WUR Beacons to be reported.

Optionally, in any of the preceding embodiments, wherein the one or more processors further execute the instructions to receive, from the station, a response message including information conveying that the station accepts the configuration in the configuration message.

Optionally, in any of the preceding embodiments, wherein the received information about the one or more first WUR Beacons comprises at least one of: first timer values obtained by the station from the one or more first WUR Beacons, second timer values obtained from a timer of the station when the one or more first WUR Beacons are received by the station, respectively, reception time interval values for reception time intervals between consecutive WUR Beacons of the one or more first WUR Beacons, signal quality measures associated with the one or more first WUR Beacons, or an error indication conveying that the one or more first WUR Beacons are erroneous WUR Beacons.

Optionally, in any of the preceding embodiments, wherein the one or more processors further execute the instructions to detect two or more equal reported first timer values in the received information.

Optionally, in any of the preceding embodiments, wherein the one or more processors further execute the instructions to transmit one or more second WUR Beacons including the identifier associated with the access node, each of the one or more second WUR Beacons further including a third timer value obtained from a timer of the access node when the each of the one or more second WUR Beacons is transmitted, and store the third timer values of the one or more second WUR Beacons transmitted, wherein detecting the erroneous WUR Beacon in the received information comprises detecting a reported first timer value of a first WUR Beacon that doesn't match with any stored third timer values of the one or more second WUR Beacons.

Optionally, in any of the preceding embodiments, wherein the one or more processors further execute the instructions to detect a difference between a reception time interval between a consecutive first WUR Beacon pair and a transmission time interval between the same consecutive first WUR Beacon pair exceeding a threshold, the transmission time interval is determined in accordance with the stored third timer values associated with the consecutive first WUR Beacon pair.

Optionally, in any of the preceding embodiments, wherein the one or more processors further execute the instructions to determine the reception time intervals for the one or more first WUR Beacons in accordance with the second timer values associated with the one or more first WUR Beacons in the received information.

Optionally, in any of the preceding embodiments, wherein the one or more processors further execute the instructions to detect a difference between a signal quality measure associated with a first WUR Beacon reported and signal quality measures associated with other first WUR Beacons reported exceeding a threshold.

Optionally, in any of the preceding embodiments, wherein the one or more processors further execute the instructions to detect the error indication conveying that the one or more first WUR Beacons are erroneous WUR Beacons.

Optionally, in any of the preceding embodiments, wherein the one or more processors further execute the instructions to transmit, to the station prior to receiving the information about the one or more first WUR Beacons, a first frame requesting a reporting of the information about the one or more first WUR Beacons.

Optionally, in any of the preceding embodiments, wherein the one or more processors further execute the instructions to transmit one or more second WUR Beacons having a RF signal bandwidth narrower than that of a signal carrying the report, while the access node is not in the secured operating mode.

Optionally, in any of the preceding embodiments, wherein the access node transmits no second WUR Beacons while in the secured operating mode.

In accordance with an example embodiment, a non-transitory computer-readable media storing computer instructions is provided, which, when executed by one or more processors, causes the one or more processors to perform the steps of receive one or more WUR Beacons, wherein the one or more WUR beacons each comprises timing information and an identifier associated with an access node, and wherein the station is configured to receive WUR Beacons with a WUR receiver, and report, to the access node, information about the one or more WUR Beacons, the information comprising at least one of second timing information, signal quality information, or error information.

Optionally, in any of the preceding embodiments, wherein the information about the one or more WUR Beacons comprises at least one of: first timer values obtained from second timer values included in the one or more WUR Beacons, third timer values obtained from a timer of a station when the one or more WUR Beacons are received, respectively, reception time interval values for reception time intervals between consecutive WUR Beacons of the one or more WUR Beacons, signal quality measures associated with the one or more WUR Beacons, or an error indication conveying that the one or more WUR Beacons are erroneous WUR Beacons.

Optionally, in any of the preceding embodiments, wherein the computer instructions causes the one or more processors to further perform the step of determine the reception time interval values for the one or more WUR Beacons in accordance with the third timer values associated with respective consecutive WUR Beacons of the one or more WUR Beacons.

Optionally, in any of the preceding embodiments, wherein the one or more WUR Beacons are erroneous WUR Beacons determined by the station, and wherein the computer instructions causes the one or more processors to further perform the steps of determine that the one or more WUR Beacons are erroneous WUR Beacons in response to at least one of: two or more equal second timer values included in the one or more WUR Beacons are detected; a difference between a reception time interval between a consecutive WUR Beacon pair of the one or more WUR Beacons and a transmission time interval between the consecutive WUR Beacon pair exceeding a threshold is detected, wherein the reception time interval is determined in accordance with the third timer values associated with the consecutive WUR Beacon pair, and wherein the transmission time interval is determined in accordance with the second timer values included in the consecutive WUR Beacon pair; or a difference between a signal quality measure associated with the one or more WUR Beacons and signal quality measures associated with other received WUR Beacons identified by the identifier associated with the access node exceeding a threshold is detected, thereby producing the error indication conveying that the one or more WUR Beacons are erroneous WUR Beacons.

Optionally, in any of the preceding embodiments, wherein the computer instructions causes the one or more processors to further perform the steps of determine, for each of the one or more WUR Beacons, an error type in accordance with the at least one of detections associated with the each of the one or more WUR Beacons, and include at least one of the error types associated with the one or more WUR Beacons or numbers conveying instances of respective error types associated with the one or more WUR Beacons in the error information reported to the access node.

In accordance with an example embodiment, a non-transitory computer-readable media storing computer instructions is provided, which, when executed by one or more processors, causes the one or more processors to perform the steps of receive, from a station associated with an access node, a report comprising information about one or more first WUR Beacons, wherein the one or more first WUR Beacons are identified by an identifier associated with the access node, and wherein the information about the one or more first WUR Beacons comprises at least one of timing information, signal quality information, or error information about the one or more first WUR Beacons, detect an erroneous WUR Beacon in accordance with the received information about the one or more first WUR Beacons, and enter a secured operating mode in response to detecting the erroneous WUR Beacon.

Optionally, in any of the preceding embodiments, wherein the received information about the one or more first WUR Beacons comprises at least one of: first timer values obtained by the station from the one or more first WUR Beacons, second timer values obtained from a timer of the station when the one or more first WUR Beacons are received by the station, respectively, reception time interval values for reception time intervals between consecutive WUR Beacons of the one or more first WUR Beacons, signal quality measures associated with the one or more first WUR Beacons, or an error indication conveying that the one or more first WUR Beacons are erroneous WUR Beacons.

Optionally, in any of the preceding embodiments, wherein the computer instructions causes the one or more processors to further perform the step of detect two or more equal reported first timer values in the received information.

Optionally, in any of the preceding embodiments, wherein the computer instructions causes the one or more processors to further perform the steps of transmit one or more second WUR Beacons including the identifier associated with the access node, each of the one or more second WUR Beacons further including a third timer value obtained from a timer of the access node when the each of the one or more second WUR Beacons is transmitted, and store the third timer values of the one or more second WUR Beacons transmitted, wherein detecting the erroneous WUR Beacon in the received information comprises detecting a reported first timer value of a first WUR Beacon that doesn't match with any stored third timer values of the one or more second WUR Beacons.

Optionally, in any of the preceding embodiments, wherein the computer instructions causes the one or more processors to further perform the steps of detect a difference between a signal quality measure associated with a first WUR Beacon reported and signal quality measures associated with other first WUR Beacons reported exceeding a threshold.

Optionally, in any of the preceding embodiments, wherein the computer instructions causes the one or more processors to further perform the step of detect the error indication conveying that the one or more first WUR Beacons are erroneous WUR Beacons.

In accordance with an example embodiment, a computer-implemented method for operating a station associated with an access node is provided. The method includes receiving, by the station, one or more Beacons, wherein the one or more Beacons each comprises timing information and an identifier associated with the access node, and wherein the station is configured to receive Beacons with a radio communications module (RCM), and reporting, by the station to the access node, information about the one or more Beacons comprising at least one of timing information about the one or more Beacons, or error information conveying that the one or more Beacons are erroneous Beacons.

Optionally, in any of the preceding embodiments, further including receiving, by the station, a configuration message specifying a configuration, and configuring, by the station and based on the configuration, the station to receive the one or more Beacons and report the information about the one or more Beacons, wherein the configuration message includes the identifier associated with the access node.

Optionally, in any of the preceding embodiments, further including transmitting, by the station in response to receiving the configuration message, a response message including information conveying that the station accepts the configuration in the configuration message.

Optionally, in any of the preceding embodiments, wherein the timing information about the one or more Beacons comprises at least one of: transmitter timer values included in the one or more Beacons, or receiver timer values obtained from a timer of the station when the one or more Beacons are received, respectively.

Optionally, in any of the preceding embodiments, wherein the one or more Beacons are erroneous Beacons determined by the station, and wherein the method further includes determining, by the station, that the one or more Beacons are erroneous Beacons in response to at least one of: detecting two or more equal transmitter timer values included in the one or more Beacons, or detecting a difference between a reception time interval between a consecutive Beacon pair of the one or more Beacons and a transmission time interval between the consecutive Beacon pair exceeding a threshold, wherein the reception time interval is determined in accordance with the receiver timer values associated with the consecutive Beacon pair, and wherein the transmission time interval is determined in accordance with the transmitter timer values included in the consecutive Beacon pair, thereby producing the error information conveying that the one or more Beacons are erroneous Beacons.

Optionally, in any of the preceding embodiments, further including determining, by the station for each of the one or more Beacons, an error type in accordance with the at least one of the detections associated with the each of the one or more Beacons, and including, by the station, at least one of the error types associated with the one or more Beacons or numbers conveying instances of respective error types associated with the one or more Beacons in the error information reported to the access node.

Optionally, in any of the preceding embodiments, further including receiving, by the station prior to reporting the information about the one or more Beacons, a first frame requesting the reporting of the information about the one or more Beacons.

In accordance with an example embodiment, a computer-implemented method for operating an access node is provided. The method includes receiving, by the access node from a station associated with the access node, a report comprising information about one or more first Beacons, wherein the information about the one or more first Beacons comprises at least one of timing information about the one or more first Beacons or error information conveying that the one or more first Beacons are erroneous Beacons, and wherein the one or more first Beacons are 802.11 compliant Beacons received by the station and identified by an identifier associated with the access node, detecting, by the access node, an erroneous Beacon in accordance with the received information about the one or more first Beacons, and entering, by the access node, a secured operating mode in response to detecting the erroneous Beacon.

Optionally, in any of the preceding embodiments, further including transmitting, by the access node to the station, a configuration message specifying a configuration configuring the station to receive the one or more first Beacons and report the information about the one or more first Beacons, wherein the configuration message includes the identifier associated with the access node.

Optionally, in any of the preceding embodiments, further including receiving, by the access node from the station, a response message including information conveying that the station accepts the configuration in the configuration message.

Optionally, in any of the preceding embodiments, wherein the timing information about the one or more first Beacons comprises at least one of: transmitter timer values obtained by the station from the one or more first Beacons, or receiver timer values obtained from a timer of the station when the one or more first Beacons are received by the station, respectively.

Optionally, in any of the preceding embodiments, wherein detecting the erroneous Beacon in accordance with the received information comprises detecting two or more equal transmitter timer values in the received information.

Optionally, in any of the preceding embodiments, further including transmitting, by the access node, one or more second Beacons including the identifier associated with the access node and first timer values obtained from a timer of the access node when the one or more second Beacons is transmitted, respectively, and storing, by the access node, the first timer values of the one or more second Beacons transmitted, wherein detecting the erroneous Beacon in accordance with the received information comprises detecting a transmitter timer value in the received information that doesn't match with any stored first timer values of the one or more second Beacons.

Optionally, in any of the preceding embodiments, wherein detecting the erroneous Beacon in accordance with the received information comprises detecting a difference between a reception time interval between a consecutive first Beacon pair of the one or more first Beacons and a transmission time interval between the consecutive first Beacon pair exceeding a threshold, wherein the reception time interval is determined in accordance with the receiver timer values associated with the consecutive first Beacon pair in the received information, and wherein the transmission time interval is determined in accordance with the transmitter timer values associated with the consecutive first Beacon pair in the received information.

Optionally, in any of the preceding embodiments, wherein detecting the erroneous Beacon in accordance with the received information comprises detecting the error information conveying that the one or more first Beacons are erroneous Beacons.

Optionally, in any of the preceding embodiments, further including transmitting, by the access node to the station prior to receiving the information about the one or more first Beacons, a first frame requesting a reporting of the information about the one or more first Beacons.

In accordance with an example embodiment, a station is provided. The station includes a memory storage comprising instructions, and one or more processors in communications with the memory storage. The one or more processors execute the instructions to receive one or more Beacons, wherein the one or more Beacons each comprises timing information and an identifier associated with the access node, and wherein the station is configured to receive Beacons with a RCM, and report, to the access node, information about the one or more Beacons comprising at least one of timing information about the one or more Beacons, or error information conveying that the one or more Beacons are erroneous Beacons.

Optionally, in any of the preceding embodiments, wherein the one or more processors further execute the instructions to receive a configuration message specifying a configuration, and configure, based on the configuration, the station to receive the one or more Beacons and report the information about the one or more Beacons, wherein the configuration message includes the identifier associated with the access node.

Optionally, in any of the preceding embodiments, wherein the one or more processors further execute the instructions to transmit, in response to receiving the configuration message, a response message including information conveying that the station accepts the configuration in the configuration message.

Optionally, in any of the preceding embodiments, wherein the timing information about the one or more Beacons comprises at least one of: transmitter timer values included in the one or more Beacons, or receiver timer values obtained from a timer of the station when the one or more Beacons are received, respectively.

Optionally, in any of the preceding embodiments, wherein the one or more Beacons are erroneous Beacons determined by the station, and wherein the one or more processors further execute the instructions to determine that the one or more Beacons are erroneous Beacons in response to at least one of: two or more equal transmitter timer values included in the one or more Beacons are detected; a difference between a reception time interval between a consecutive Beacon pair of the one or more Beacons and a transmission time interval between the consecutive Beacon pair exceeding a threshold is detected, wherein the reception time interval is determined in accordance with the receiver timer values associated with the consecutive Beacon pair, and wherein the transmission time interval is determined in accordance with the transmitter timer values included in the consecutive Beacon pair, thereby produce the error information conveying that the one or more Beacons are erroneous Beacons.

Optionally, in any of the preceding embodiments, wherein the one or more processors further execute the instructions to determine, for each of the one or more Beacons, an error type in accordance with the at least one of detections associated with the each of the one or more Beacons, and include at least one of the error types associated with the one or more Beacons or numbers conveying instances of respective error types associated with the one or more Beacons in the error information reported to the access node.

Optionally, in any of the preceding embodiments, wherein the one or more processors further execute the instructions to receive, prior to reporting the information about the one or more Beacons, a first frame requesting the reporting of the information about the one or more Beacons.

In accordance with an example embodiment, an access node is provided. The access node includes a memory storage comprising instructions, and one or more processors in communications with the memory storage. The one or more processors execute the instructions to receive, from a station associated with the access node, a report comprising information about one or more first Beacons, wherein the information about the one or more first Beacons comprises at least one of timing information about the one or more first Beacons or error information conveying that the one or more first Beacons are erroneous Beacons, and wherein the one or more first Beacons are 802.11 compliant Beacons received by the station and identified by an identifier associated with the access node, detect an erroneous Beacon in accordance with the received information about the one or more first Beacons, and enter a secured operating mode in response to detecting the erroneous Beacon.

Optionally, in any of the preceding embodiments, wherein the one or more processors further execute the instructions to transmit, to the station, a configuration message specifying a configuration configuring the station to receive the one or more first Beacons and report the information about the one or more first Beacons, wherein the configuration message includes the identifier associated with the access node.

Optionally, in any of the preceding embodiments, wherein the one or more processors further execute the instructions to receive, from the station, a response message including information conveying that the station accepts the configuration in the configuration message.

Optionally, in any of the preceding embodiments, wherein the timing information about the one or more first Beacons comprises at least one of: transmitter timer values obtained by the station from the one or more first Beacons, or receiver timer values obtained from a timer of the station when the one or more first Beacons are received by the station, respectively.

Optionally, in any of the preceding embodiments, wherein the one or more processors further execute the instructions to detect two or more equal transmitter timer values in the received information.

Optionally, in any of the preceding embodiments, wherein the one or more processors further execute the instructions to transmit one or more second Beacons including the identifier associated with the access node and first timer values obtained from a timer of the access node when the one or more second Beacons is transmitted, respectively, and store the first timer values of the one or more second Beacons transmitted, wherein detecting the erroneous Beacon in accordance with the received information comprises detecting a transmitter timer value in the received information that doesn't match with any stored first timer values of the one or more second Beacons.

Optionally, in any of the preceding embodiments, wherein the one or more processors further execute the instructions to detect a difference between a reception time interval between a consecutive first Beacon pair of the one or more first Beacons and a transmission time interval between the consecutive first Beacon pair exceeding a threshold, wherein the reception time interval is determined in accordance with the receiver timer values associated with the consecutive first Beacon pair in the received information, and wherein the transmission time interval is determined in accordance with the transmitter timer values associated with the consecutive first Beacon pair in the received information.

Optionally, in any of the preceding embodiments, wherein the one or more processors further execute the instructions to detect the error information conveying that the one or more first Beacons are erroneous Beacons.

Optionally, in any of the preceding embodiments, wherein the one or more processors further execute the instructions to transmit, to the station prior to receiving the information about the one or more first Beacons, a first frame requesting a reporting of the information about the one or more first Beacons.

In accordance with an example embodiment, a non-transitory computer-readable media storing computer instructions is provided, which, when executed by one or more processors, causes the one or more processors to perform the steps of receive one or more Beacons, wherein the one or more Beacons each comprises timing information and an identifier associated with the access node, and wherein the station is configured to receive Beacons with a RCM, and report, to the access node, information about the one or more Beacons comprising at least one of timing information about the one or more Beacons, or error information conveying that the one or more Beacons are erroneous Beacons.

Optionally, in any of the preceding embodiments, wherein the timing information about the one or more Beacons comprises at least one of: transmitter timer values included in the one or more Beacons, or receiver timer values obtained from a timer of the station when the one or more Beacons are received, respectively.

Optionally, in any of the preceding embodiments, wherein the one or more Beacons are erroneous Beacons determined by the station, and wherein the computer instructions causes the one or more processors to further perform the steps of determine that the one or more Beacons are erroneous Beacons in response to at least one of: two or more equal transmitter timer values included in the one or more Beacons are detected; a difference between a reception time interval between a consecutive Beacon pair of the one or more Beacons and a transmission time interval between the consecutive Beacon pair exceeding a threshold is detected, wherein the reception time interval is determined in accordance with the receiver timer values associated with the consecutive Beacon pair, and wherein the transmission time interval is determined in accordance with the transmitter timer values included in the consecutive Beacon pair.

Optionally, in any of the preceding embodiments, wherein the computer instructions causes the one or more processors to further perform the steps of determine, for each of the one or more Beacons, an error type in accordance with the at least one of detections associated with the each of the one or more Beacons, and include at least one of the error types associated with the one or more Beacons or numbers conveying instances of respective error types associated with the one or more Beacons in the error information reported to the access node.

In accordance with an example embodiment, a non-transitory computer-readable media storing computer instructions is provided, which, when executed by one or more processors, causes the one or more processors to perform the steps of receive, from a station associated with an access node, a report comprising information about one or more first Beacons, wherein the information about the one or more first Beacons comprises at least one of timing information about the one or more first Beacons, or error information conveying that the one or more Beacons are erroneous Beacons, and wherein the one or more first Beacons are 802.11 compliant Beacons received by the station and identified by an identifier associated with the access node, detect an erroneous Beacon in accordance with the received information about the one or more first Beacons, and enter a secured operating mode in response to detecting the erroneous Beacon.

Optionally, in any of the preceding embodiments, wherein the timing information about the one or more first Beacons comprises at least one of: transmitter timer values obtained by the station from the one or more first Beacons, or receiver timer values obtained from a timer of the station when the one or more first Beacons are received by the station, respectively.

Optionally, in any of the preceding embodiments, wherein the computer instructions causes the one or more processors to further perform the step of detect two or more equal transmitter timer values in the received information.

Optionally, in any of the preceding embodiments, wherein the computer instructions causes the one or more processors to further perform the steps of transmit one or more second Beacons including the identifier associated with the access node and first timer values obtained from a timer of the access node when the one or more second Beacons is transmitted, respectively, and store the first timer values of the one or more second Beacons transmitted, wherein detecting the erroneous Beacon in the received information comprises detecting a transmitter timer value in the received information that doesn't match with any stored first timer values of the one or more second Beacons.

Optionally, in any of the preceding embodiments, wherein the computer instructions causes the one or more processors to further perform the step of detect the error information conveying that the one or more first Beacons are erroneous Beacons.

Practice of the foregoing embodiments enables the detection of a faked or replayed beacon signal received within a wireless communications system. In such a wireless communications system, legitimate beacon signals are transmitted periodically by a transmitting device to carry timing information for maintaining time synchronization between the transmitting device and one or more receiving devices within the wireless communications system. Maintaining time synchronization allows the receiving device to place their respective wake-up radio (WUR) receivers in an active mode only within pre-scheduled time slots for potentially receiving wake-up signals and to place their respective WUR receivers in a power-saving mode outside of the pre-scheduled time slots to further reduce power consumption. The faked beacon signal or the replayed version of a spoofed legitimate beacon signal would present erroneous timing information, potentially causing time de-synchronization in at least one of the one or more receiving devices, thereby causing the at least one of the one or more receiving devices to become unable to be woken up.

Practice of the foregoing embodiments enables the transmitting device of the legitimate beacon signals to take corrective action upon detection of the faked or replayed beacon signal. For example, the transmitting device may enter the receiving devices participating in the WUR operation within the wireless communications system into a secured mode, i.e., a mode that can operate without the beacon signals, for example, an always-on mode or an asynchronous wake-up mode. For another example, the transmitting device may attempt to recover any receiving devices operating in a duty-cycled WUR mode and have already been victimized by the faked or replayed beacon signals, by waking them up (in accordance with the asynchronous wake-up mode, for example), correcting their timing, placing them into the secured mode of WUR operation, and waking them up in accordance with the secured mode when needed.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 illustrates an example IEEE 802.11 communications system with a low-power wake-up radio according to example embodiments described herein;

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
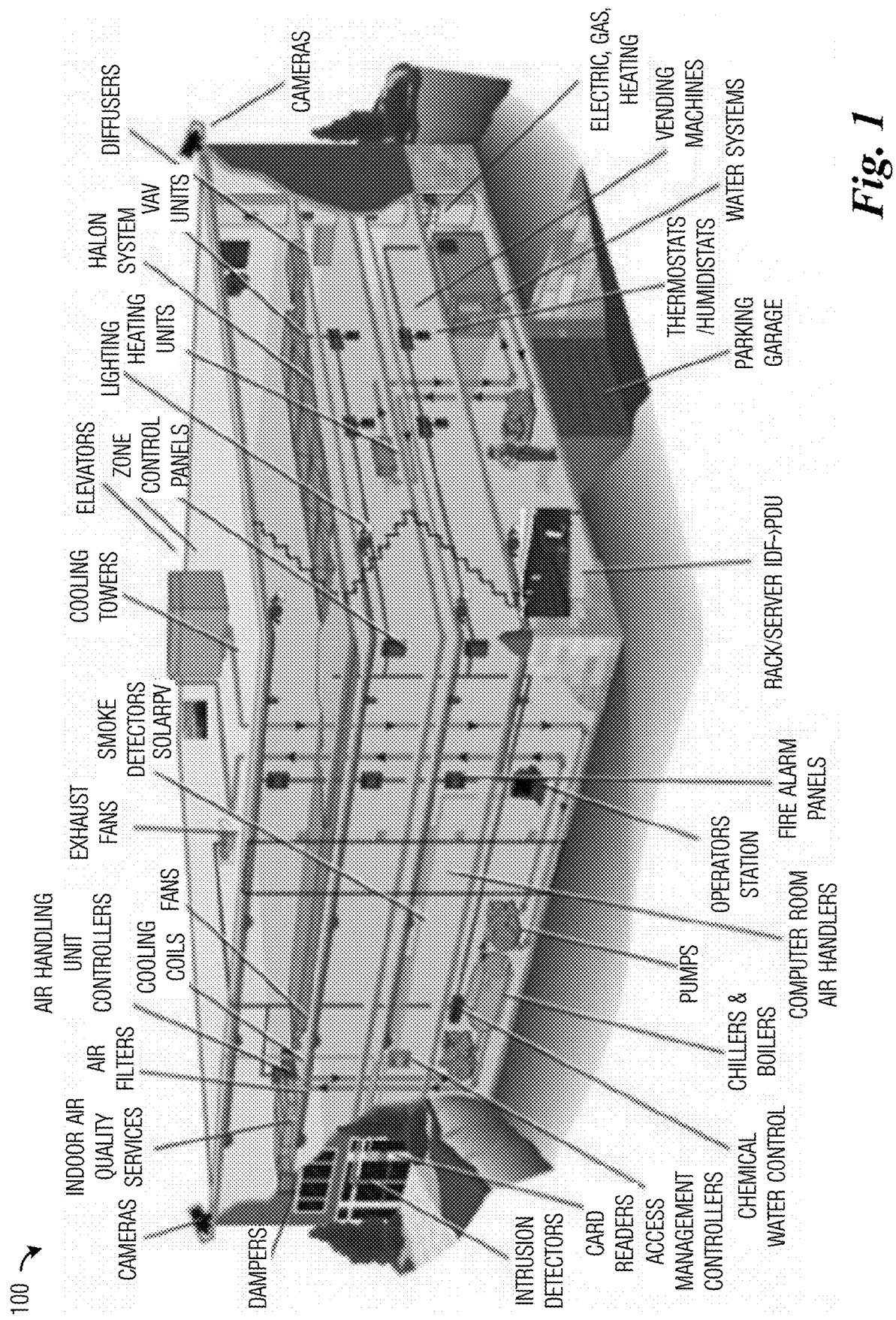
FIG. 1 illustrates an example smart building highlighting various sensors and monitoring devices.

The Internet of Things (IoT) is a suite of technologies and applications that enable devices and locations to generate all kinds of information—and to connect those devices and locations for instant data analysis and, ideally, "smart" actions. For example, the IoT promises to facilitate smart buildings by uniting a variety of sensors and facility equipments into an integrated whole. FIG. 1 illustrates an example smart building 100 highlighting various sensors and monitoring devices, which are deployed in or around a commercial or residential building to monitor various conditions such as lighting, temperature, air quality, fire, smoke, carbon monoxide (CO) gas, security, intrusion, etc., and various facility equipments such as lighting equipments, heating or cooling equipments, air ventilation equipments, fire alarms, sprinkling system, security alarms, information systems, etc., which are deployed to control the various fore-mentioned conditions in order to provide a healthy, comfort, and safe environment for people in the building and to do so in an energy-efficient manner. The various sensors and monitoring devices communicate with the various facility equipments, either directly or via a communications and control center, by using data communications technologies. For example, one or more data access points may be deployed throughout a smart building, where the data access points are connected to a center of communications, data analysis, and control, typically via wired connections such as cables. The data access points are also connected to the various sensors and monitoring devices, as well as communications modules on the various facility equipments, typically via radio communications (such as Wi-Fi, BlueTooth, and ZigBee), so that the various sensors and equipments may be deployed anywhere in the building at a later time without the need to alter the previous cable-wiring. Many of these sensors and the communications modules operate on battery power.

The IEEE Standard 802.11-2016 is a set of media access control (MAC) layer and physical (PHY) layer specifications for implementing wireless local area network (LAN) or wireless fidelity (Wi-Fi) communications in the 2.4, 5, and 60 GHz frequency bands. A basic service set (BSS) provides the basic building-block of an 802.11 wireless LAN. In an infrastructure mode of 802.11, a single access point (AP) together with all associated stations (STAs) form a BSS. The AP acts as a master to control the STAs within that BSS. A station (STA) may also be referred to as a device, a user equipment, a terminal, a node, and so forth. An AP may also be referred to as a network controller, a base station, a wireless router (due to a router co-located with the AP, the router providing a connection to a network), and so on. The simplest infrastructure BSS consists of one AP and one STA.

Figure 2:
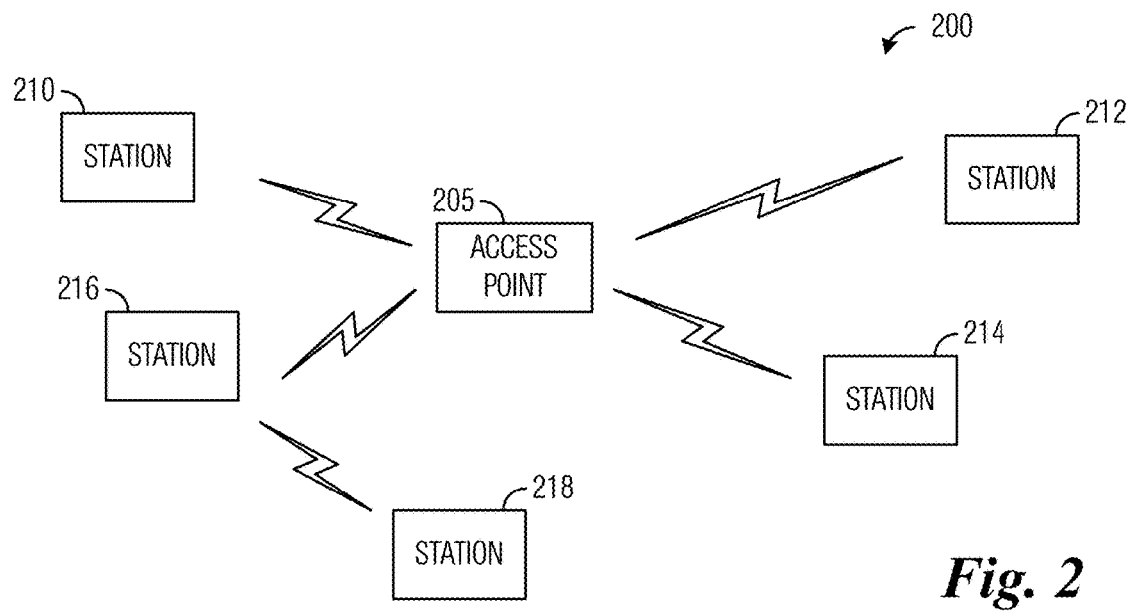
FIG. 2 illustrates an example communications system consisting of an infrastructure BSS.

FIG. 2 shows an example communications system 200 consisting of an infrastructure BSS. Communications system 200 includes an access point (AP) 205 that is serving a plurality of stations, such as stations 210, 212, 214, 216, and 218. Access point 205 controls certain aspects (such as radio frequency channel, transmission power limit, authentication, security, etc.) of communications with or among its associated stations. Generally speaking, in communications system 200, wireless resources for both uplink (station to access point) and downlink (access point to station) transmissions are accessed by transmitters based on a distributed contention mechanism commonly referred to as carrier sensing multiple access with collision avoidance (CSMA/CA). However, access point 205 still may influence the resource allocation by assigning different access priorities to stations or traffic types, and when succeeding in channel contention, by explicitly allocating certain time periods for certain stations or traffics or for special purposes, such as Quiet Period during which time no transmitter may transmit.

FIG. 3 illustrates an example IEEE 802.11 communications system 300 with a low-power wake-up radio (LP-WUR). Communications system 300 includes a transmitting device 305 and a receiving device 310. Examples of transmitting device 305 may include an AP attempting to wake up a sleeping STA associated with the AP, a STA attempting to wake up a sleeping AP serving the STA, and a STA operating in a peer-to-peer (P2P) communications mode and attempting to wake up a peer STA that is sleeping. Examples of receiving device 310 may include a sleeping STA served by an AP, a sleeping AP, a sleeping STA operating in the P2P communications mode. The terms transmitting device and receiving device are used herein to reflect the roles that the devices play, respectively, with regards to the transmission or reception of narrow-band signals, which are described herein as the wake-up packet and the WUR Beacon. These terms should not be construed as a limitation of these devices with regards to their overall capability of transmitting and receiving signals as a communications device. As the following description will show, both the transmitting device and the receiving device are capable of transmitting and receiving wide-band signals using their respective radio communications module (RCM). RCMs may also be commonly referred to as main radios or primary connectivity radios (PCRs). Transmitting device 305 includes, among other things, an enhanced 802.11 RCM (labelled "802.11+") 307. Enhanced 802.11 RCM 307 is capable of communications utilizing IEEE 802.11 standard signaling, as well as LP-WUR signaling, including the transmission of a wake-up packet. At least a payload portion of the wake-up packet may be transmitted over a much narrower channel bandwidth than the IEEE 802.11 standard signaling. For example, IEEE 802.11 standard signaling may be transmitted over a channel bandwidth of 20 MHz and the payload of the wake-up packet may be transmitted over a channel bandwidth of 5 MHz or less. A narrower bandwidth helps to reduce the cost and power consumption of an intended receiver, such as one in receiving device 310, which is very desirable for designing a LP-WUR. It is noted that in some places the term WUR refers to the wake-up radio technique as a whole, which comprises a wake-up packet, a first device transmitting the wake-up packet, a receiver of a second device receiving the wake-up packet, and the use of the wake-up packet to wake up an RCM of the second device from a sleep mode. In some other places, WUR just narrowly refers to the receiver of the second device that is configured to receive the wake-up packet. As related to the discussion presented herein, when discussing the wake-up receiver and not the wake-up radio technique as a whole, the term receiver is added after WUR.

Receiving device 310 includes, among other things, an 802.11 RCM 312 and a LP-WUR 314, wherein LP-WUR 314 comprises a wake-up receiver of receiving device 310. 802.11 RCM 312 is intended for communicating user data while LP-WUR 314 is not. Thus, LP-WUR 314 usually does not have a transmitter. LP-WUR 314 is present to assist in waking up 802.11 RCM 312 from a sleeping or OFF mode. In general, LP-WUR 314 is ON when 802.11 RCM 312 is OFF (e.g., in the sleeping mode). LP-WUR 314 comprises a memory (or register) designed to store a value provided by a processor associated with 802.11 RCM 312, a receiver designed to receive at least the payload of the wake-up packet, and a comparator designed to compare a value in the received payload with the value stored in the memory. The comparator generates a signal referred to as a wake-up interrupt when the received value matches with the stored value. LP-WUR 314 is coupled to 802.11 RCM 312 through a connection used for carrying the wake-up interrupt, which may be used by LP-WUR 314 to wake up 802.11 RCM 312 from the sleeping mode.

In computer science, an interrupt is a term used for a signal external to a processor that alerts the processor to a high-priority condition or event requiring the interruption of the current program the processor is executing. The processor responds by suspending its current activities and executing programs to deal with the event. The interruption may be temporary, and, after the execution of programs dealing with the event finishes, the processor may resume its current activities. For example, when there is no data communications for a while or when a sleep command is received, a processor associated with 802.11 RCM 312 may execute a program that places at least a major portion of the electronic circuits inside 802.11 RCM 312 into a sleeping mode, which may also be referred to as a power save mode or a power off mode. While the portion of the electronic circuits of 802.11 RCM 312 is in the sleeping mode, the capabilities of 802.11 RCM 312 is disabled to the extent that 802.11 RCM 312 is no longer capable of communications utilizing IEEE 802.11 standard signaling. The processor associated with 802.11 RCM 312 responds to the wake-up interrupt generated by LP-WUR 314 by powering up the electronic circuits inside 802.11 RCM 312 thereby resuming its capability to communicate utilizing IEEE 802.11 standard signaling. In general, when in the ON or active state, 802.11 RCM 312 will consume significantly greater power than LP-WUR 314, at least one or two orders of magnitude more power. An example target power consumption for LP-WUR 314 is less than 100 micro-watts while ON. The receiver of LP-WUR 314 has a narrow radio frequency (RF) bandwidth matching the bandwidth of the payload of the wake-up packet, 5 MHz or less than, for example, and has a reception range that is approximately equal to that of 802.11 RCMs.

When performing 802.11 communications, transmitting device 305 transmits data packets, such as data packet 320, to receiving device 310, where 802.11 RCM 312 receives and processes the data packet.

As shown in FIG. 3, receiving device 310 initially is in a reduced power state. One of the ways that receiving device 310 is able to reduce power consumption is to turn OFF 802.11 RCM 312 while keeping LP-WUR 314 ON. When receiving device 310 is in the reduced power state, 802.11 RCM 312 is OFF and receiving device 310 is unable to receive or process 802.11 data packets.

However, LP-WUR 314 remains ON and receiving device 310 is able to receive wake-up packets, such as wake-up packet 325. In a situation where transmitting device 305 has data to transmit to receiving device 310, but receiving device 310 is in the reduced power state, transmitting device 305 first transmits wake-up packet 325 to receiving device 310, e.g., using 802.11+ RCM 307. Wake-up packet 325 is received and processed by LP-WUR 314, which wakes up 802.11 RCM 312. Then, transmitting device 305 transmits data to receiving device 310 using 802.11+ RCM 307 and receiving device 310 receives the data using 802.11 RCM 312.

A highlight 399 provides a detailed view of an example wake-up packet, e.g., wake-up packet 325. The wake-up packet includes a preamble 332 and a payload 334. Preamble 332 is compliant to 802.11 technical standards and includes a Legacy short training field (L-STF) 340, a Legacy long training field (L-LTF) 342, and a Legacy SIGNAL field (L-SIG) 344. Payload 334 includes multiple fields, including a wake-up preamble 350, a medium access control (MAC) header (e.g., comprising a receiver MAC address or a WUR identifier (WUID) used for identifying the intended recipient) 352, a frame body 354, and a frame check sequence (FCS) 356. Wake-up preamble 350 contains a wake-up sequence. The wake-up sequence may be a pseudo-random number sequence, for example, possessing good auto-correlation properties, or simply a sequence of alternating "1010 . . . " bits, for another example, in order to assist LP-WUR receivers to acquire timing for sampling and detecting the remainder of payload 334. MAC header 352 contains an address or identifier (such as WUID) of a receiving device that wake-up packet 325 is intended to wake up. Frame body 354 may contain other information. FCS 356 includes a cyclic-redundancy check (CRC) for integrity checking wake-up packet 325. In order to maintain compatibility with 802.11 compliant devices in communications system 300, preamble 332 is an 802.11 legacy preamble transmitted over a channel bandwidth complaint with 802.11 standard signaling, such as 20 MHz.

Preamble 332 is not to be detected by the LP-WUR receivers, such as LP-WUR 314, because the receiver bandwidth of LP-WUR is usually insufficient to receive 802.11 legacy preambles, such as preamble 332. Instead, preamble 332 is intended for legacy 802.11 devices to prevent them from transmitting during the transmission of payload 334. A LENGTH subfield of L-SIG 344 in preamble 332 is used to convey information regarding the duration of payload 334. Payload 334 includes information that is modulated using a simple modulation scheme, such as On-Off-Keying (OOK) and is transmitting over a narrower channel bandwidth, such as 5 MHz or less. Therefore, legacy 802.11 devices normally won't be able to detect information (except for the energy) carried in payload 334. However, legacy 802.11 devices are capable of detecting preamble 332 because preamble 332 fully complies with the bandwidth and signal format of legacy 802.11 standards. Thus, when receiving preamble 332, legacy 802.11 devices recognize that the channel will be busy for at least a duration as informed by the LENGTH value of the LENGTH subfield of L-SIG 344 and thereafter suspend their attempts of transmitting during the transmission of payload 334, as if payload 334 complied with IEEE 802.11 standard signaling.

Figure 4:
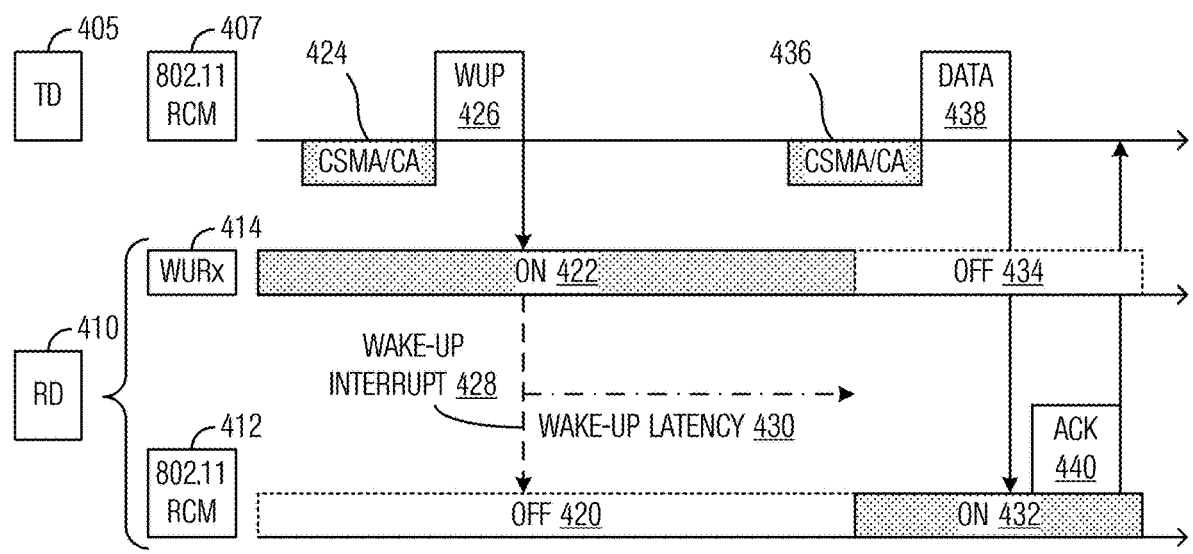
FIG. 4 illustrates an example sequence of events for waking up a communications station to receive a transmission.

FIG. 4 illustrates an example sequence of events, wherein a transmitting device 405 wakes up a receiving device 410 in order to transmit a short data to receiving device 410. It is noted that in the figures, transmitting device and receiving device are abbreviated as TD and RD, respectively. Transmitting device 405 includes, among other things, an enhanced 802.11 RCM 407. Enhanced 802.11 RCM 407 is capable of communications utilizing IEEE 802.11 standard signaling, as well as transmitting of a wake-up packet (e.g., wake-up packet 325). It is noted that wake-up packet is abbreviated as WUP in the figures. Receiving device 410 includes, among other things, an 802.11 RCM 412 and a WUR receiver (WURx) 414. As shown in FIG. 4, 802.11 RCM 412 is initially placed in a sleep mode (shown as dot-lined block OFF 420) and WURx 414 is active (shown as shaded block ON 422). 802.11 RCM 407 initiates a CSMA/CA based channel contention procedure (shown as shaded block CSMA/CA 424). 802.11 RCM 407 wins the channel contention and transmits the wake-up packet (shown as WUP 426). WURx 414 receives the wake-up packet and wakes up 802.11 RCM 412 with a wake-up interrupt signal 428. Then, it takes a period of time (shown as wake-up latency 430) for the electronics circuits in 802.11 RCM 412 to be powered up and become ready for transmitting and receiving conventional 802.11 signals. At the end of wake-up latency 430, 802.11 RCM 412 becomes active (shown as shaded block ON 432) and WURx 414 is sleeping (shown as dot-lined block OFF 434). 802.11 RCM 407 of transmitting device 405 initiates a second CSMA/CA based channel contention procedure (shown as shaded block CSMA/CA 436). 802.11 RCM 407 wins the second channel contention and transmits data to 802.11 RCM 412 (shown as data 438). 802.11 RCM 412 of receiving device 410 transmits an acknowledgement (ACK) frame back after correctly receiving the data (shown as ACK 440). The data exchange may continue until all data have been transmitted and received. Then, 802.11 RCM 412 may be placed back into the sleep mode. The IEEE 802.11 standards further specifies that when the data to be transmitted is large, the transmitting device should transmit a request-to-send (RTS) frame to the receiving device and subsequently receive a clear-to-send (CTS) frame back before transmitting the data in one or more data-ACK exchanges.

One way to ensure that the WURx of the receiving device can receive the wake-up packet transmitted by the transmitting device is to have the WURx of the receiving device operate in an always-on mode, wherein the WURx of the receiving device is always active and listening for wake-up packets as long as the RCM of the receiving device is sleeping. Because the transmitting device may send a wake-up packet to the WURx of the receiving device at any time to wake up the sleeping RCM of the receiving device, the transmitting device isn't required to maintain a synchronization between a clock of the transmitting device and a clock of the receiving device even if the clock of the receiving device drifts over time relative to the clock of the transmitting device.

Figure 5:
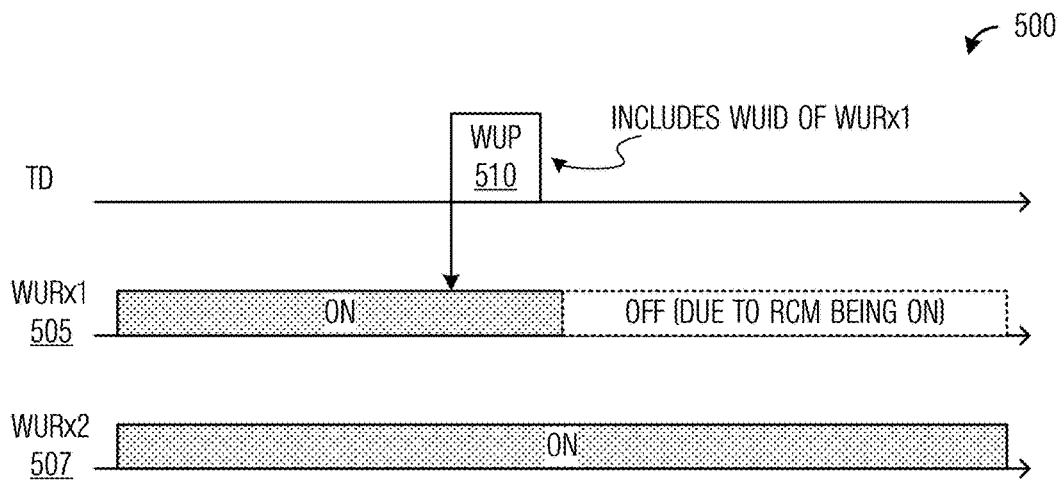
FIG. 5 illustrates a diagram of example wake-up operations in an always-on mode.

FIG. 5 illustrates a diagram 500 of example wake-up operations in the always-on mode. As shown in FIG. 5, two WURx (WURx1 505 and WURx2 507) of two receiving devices are active and operate in the always-on mode initially. For simplicity, the RCMs of these two receiving devices, which are associated with WURX1 505 and WURx2 507, respectively, are not shown in FIG. 5. WURx1 505 receives a wake-up packet 510 containing a wake-up identifier (WUID) of WURx1 505 and therefore wakes up the RCM associated with WURx1 505. Then, WURx1 505 is placed into a sleep (Off) mode after the RCM associated with WURx1 505 is woken up. Because WUP 510 does not include the WUID of WURx2 507, WURx2 507 remains on, and detecting for WUPs. Keeping the WURx of a receiving device always on while the RCM of the receiving device is sleeping may reduce latency for waking up the RCM of the receiving device, but also increases the power consumption of the receiving device due to the WURx being on all the time as long as the RCM of the receiving device is sleeping.

To further reduce power consumption, a WURx of a receiving device may operate in a duty-cycled mode when the RCM of the receiving device is sleeping or powered off. The duty-cycled mode is defined as an operating mode in which the WURx is active and detecting for packets complying with WUR signaling format during a fraction of every duty-cycle period. The fraction of the duty-cycle period when the WURx is active is referred to as an "On" period and the remaining fraction of the duty-cycle period is referred to as an "Off" period. The WURx may be placed in a power reduced state (such as sleeping) during the "Off" periods so that the power consumed by the WURx during the "Off" periods is negligible comparing to the power consumed during the "On" periods. For example, during the "Off" periods, the WURx may power down a majority of its electronics circuits (such as a radio frequency (RF) filter, a low noise amplifier, an energy envelop detector, a Manchester decoder, a comparator, a processor, etc.), while keeping a clock and a power management unit powered on in order to track time elapsed and to turn the majority of the electronic circuits back on before the next "On" period. Thus, generally speaking, a WURx operating in the duty-cycled mode is unable to receive the wake-up packets during the "Off" periods, therefore unable to wake up the RCM of the receiving device during the "Off" periods. Hence, the transmitting device must be able to transmit a wake-up packet during an "On" period of the WURx in order to wake up the receiving device.

There are several ways to ensure that a WURx operating in a duty-cycled mode can receive the wake-up packet. A first is referred to as synchronous duty-cycled mode. A second is referred to as asynchronous duty-cycled mode.

In the synchronous duty-cycled mode, the transmitting device and the receiving device each determines the timing of the "On" periods of the WURx of the receiving device based on the duty-cycle parameters agreed between the transmitting device and the receiving device and the readings of their local clocks (or timers), respectively. The duty-cycle parameters include information to determine the "On" and "Off" durations, such as the duration and duty ratio of each duty-cycle period, or the durations of each duty-cycle period and "On" period, respectively, or the durations of "On" and "Off" periods, respectively, within each duty-cycle period. The duty-cycle parameters also include information used for determining the beginning time of each duty-cycle period, which usually is also where the "On" period within that duty-cycle period begins, wherein the information is typically expressed as an offset value such that a duty-cycle period begins whenever the reading on the clock modulo the duration of the duty-cycle period equals to the offset value. The transmitting device determines the timings of the "On" periods of the WURx of the receiving device in order to be able to transmit a wake-up packet to the receiving device during one of the "On" periods of the WURx of the receiving device (as perceived by the transmitting device), while the receiving device determine such timings in order to actually turn its WURx on and off during the "On" and "Off" periods, respectively.

Although the transmitting device and the receiving device share the same duty-cycle parameters, their clocks may drift relative to each other. Therefore, in the synchronous duty-cycled mode, maintaining the synchrony between the clocks of the transmitting device and the receiving device may be critical as to how well the "On" period that the transmitting device uses for transmitting the wake-up packet to the receiving device matches one of the "On" periods that the WURx of the receiving device is actually on and detecting for the wake-up packet. The worst-case scenario for the transmitting device and the receiving device being out of synchrony is when the "On" periods, as perceived by the transmitting device for the receiving device, are each completely offset from the actual "On" periods of the receiving device. In such the worst-case scenario, the transmitting device becomes unable to wake up the RCM of the receiving device if the transmitting device strictly follows its perceived "On" periods of the receiving device in its attempts to wake up the RCM of the receiving device because the wake-up packet will be transmitted while the receiving device is in an "Off" period and does not have its WURx on to receive the wake-up packet.

Figure 6:
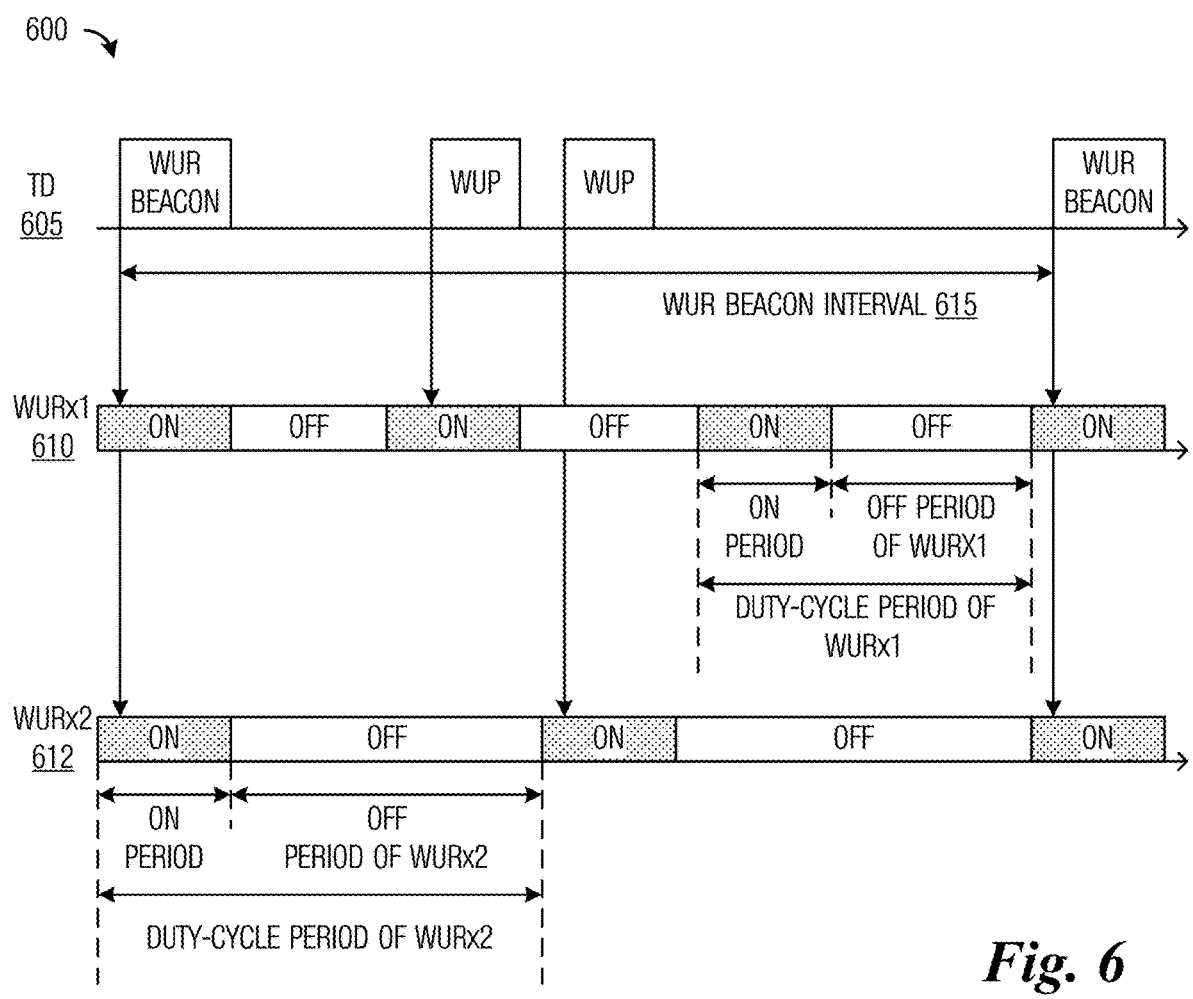
FIG. 6 illustrates a diagram of example wake-up operations in a synchronous duty-cycled mode.

FIG. 6 illustrates a diagram 600 of example wake-up operations in the synchronous duty-cycled mode. As shown in FIG. 6, a transmitting device (such as the AP) 605 periodically transmits (broadcasts or multicasts, for example) a beacon packet complying with the WUR signaling format (such as with a signaling bandwidth of 5 MHz or less and the modulation scheme of OOK) and containing information of a clock of the transmitting device. Such a beacon packet is hereby referred to herein as a WUR Beacon in order to differentiate it from the conventional 802.11 Beacon frame, which complies with the conventional 802.11 signaling format (such as with a signaling bandwidth of 20 MHz or more and that the modulation scheme of orthogonal frequency division multiplexing (OFDM)). The clock information (i.e., the information of the clock) contained in the WUR Beacons is used by the WURx of the receiving device (such as WURx1 610 and WURx2 612) to maintain synchronization between a clock of the receiving device and the clock of the transmitting device, for example.

An example of the clock information is a timestamp (also known as a timer synchronization function or TSF) or partial timestamp (such as a partial TSF) value, which is the value of a TSF timer incremented at a uniform rate in accordance with a local oscillator. The TSF timer is defined in IEEE Standard 802.11-2016 as a 64-bit timer, which increments once every 1 microsecond. A partial TSF (PTSF) is a specific subset of the 64 bits of the TSF, typically by eliminating a certain number of most significant bits (MSBs) (due to the excessive range of time that can be expressed by these MSBs) and a certain number of least significant bits (LSBs) (due to the excessive granularity of time that can be expressed by these LSBs). For example, IEEE Standard 802.11ah-2016, Clause 9.3.4.3, defines a Timestamp field in a SIG Beacon frame as "The Timestamp field contains the 4 least significant octets of the transmitting STA's TSF timer at the time that the start of the data symbol, containing the first bit of the Timestamp, is transmitted by the PHY plus the transmitting STA's delays through its local PHY from the MAC-PHY interface to its interface with the WM.", where SIG is the abbreviation for sub-1 GHz, which is the frequency band that 802.11ah complaint systems operate in, and WM is the abbreviation for wireless medium (e.g., a wireless channel). For the sake of simplicity, timestamp, partial timestamp, TSF, and partial TSF (PTSF) refer to a value in accordance with a TSF timer (i.e., the local clock) in the rest of the discussion, without the further considering the delays caused by signal going through the local PHY (such as wires and electronic circuitry) of a device from the MAC-PHY interface to the device's interface (such as antennas) with the WM (if the device is on the transmitting side), or vice versa, from the device's interface with the WM to the device's MAC-PHY interface (if the device is on the receiving side).

Clearly, the Timestamp field in the SIG Beacon frame defined by IEEE Standard 802.11ah-2016 carries an example partial TSF value when compared to the full 64-bit TSF value. Because the WUR Beacons are transmitted with OOK modulation scheme, which has very low spectrum efficiency, it is also desirable to use a partial TSF value as the clock information in the WUR Beacons so as to reduce signaling overhead. Thus, the receiving device may use the clock information (whether a partial or full TSF value from the transmitting device) received in a WUR Beacon to correct any drift of its local clock (relative to the clock of the transmitting device). The IEEE 802.11 defined 64-bit TSF timer, incremented every 1 microsecond, will roll over roughly once every 585,000 years, which is unnecessarily long. However, a very short length partial TSF value may roll over much sooner than that. For example, if bit 0 and bit 63 represents the LSB and the MSB of the 64-bit TSF value, respectively, and a partial TSF value comprises the values of bits 8 to 19 of the 64-bit TSF value, then the partial TSF value will roll over roughly once every second. It is noted that in a situation where the WUR Beacons carry a partial TSF value, the receiving device not only uses the received partial TSF value to set the corresponding bits of its own TSF timer (i.e., the local clock of the receiving device), but the receiving device also needs to determine whether a roll over of the received partial TSF value has occurred since the last WUR Beacon. If roll over has occurred, the receiving device may need to adjust the higher significant bits (e.g., the bits above the bits of the received partial TSF value) accordingly. IEEE Standard 802.11ah-2016, in Clause 11.1.3.10.3, has presented techniques on how to determine whether roll over has occurred and how to adjust the higher significant bits accordingly.

In addition to maintaining time synchronization, the transmitting device also knows the offset value (used for determining the beginning time of each duty-cycle period and thus the beginning time of each "On" period) and the durations of the "On", "Off", and duty-cycle periods of the WURx of the receiving device. For example, the transmitting device is an AP serving one or more STAs (i.e., the receiving devices) and the AP obtains information related to the offset value and the durations of the "On", "Off", and duty-cycle periods of the WURx of each of the one or more STAs served by the AP when the AP performs an association procedure or a WUR configuration procedure with the RCM of the each STA. Hence, the transmitting device is able to determine when an "On" period of the WURx of the receiving device starts and ends in accordance with the clock of the transmitting device, because the receiving device is supposed to determine when its "On" periods start and end in accordance with its local clock, which is synchronized with the clock of the transmitting device. Therefore, the transmitting device is able to send a wake-up packet to the WURx during the "On" period of the WURx.

The transmitting device also periodically transmits a WUR Beacon during an "On" period of the WURx of the receiving device. Due to the possibility of different receiving devices having different requirements for power consumption and wake-up latency, the transmitting device may negotiate or configure a same duration of "On" periods for the WURxes of all receiving devices but with different durations of duty-cycle periods (thus different duty ratios) for the WURxes of different receiving devices. FIG. 6 illustrates such a scenario. Alternatively, the transmitting device may negotiate or configure a same duration of duty-cycle periods for the WURxes of all receiving devices but with different durations of "On" periods (thus different duty ratios) for the WURxes of different receiving devices. Yet alternatively, the transmitting device may negotiate or configure different durations for both "On" periods and duty-cycle periods for the WURxes of different receiving devices. However, it is preferred that at least once in a while, the "On" periods of different receiving devices are aligned so that the transmitting device may broadcast or multicast a WUR beacon for all receiving devices to synchronize their local clocks. For example, as shown in FIG. 6, by making the interval between two successive WUR Beacons (referred to as the WUR Beacon interval 615) both an integer multiple of a duty-cycle period of WURx1 610 and an integer multiple of a duty-cycle period of WURx2 612, the "On" periods of WURx1 610 and WURx2 612 are aligned at least once every period referred to as the WUR Beacon interval.

A WUR Beacon has a same bandwidth and a same general format as the wake-up packet (such as wake-up packet 325 in FIG. 3) and is differentiated from the wake-up packet (used for waking up a RCM) or other types of WUR packets that share the same bandwidth and format by a value in a Type field in the MAC header (such as MAC header 352 in FIG. 3) of the WUR Beacon. Another difference is that a WUR Beacon carries an identifier of the transmitting device or an identifier associated with the transmitting device, instead of an identifier of the receiving device, because a WUR Beacon is broadcasted. For example, an AP (acting as the transmitting device) periodically transmits WUR Beacons to its STAs (acting as the receiving devices) operating in the WUR mode. The identifier of the AP, such as a partial BSS identifier (PBSSID) or an identifier of a BSS (e.g., BSSID) served by the AP, carried in the WUR Beacon helps to indicate the presence of the AP so that a STA served by the AP and with its RCM sleeping while moving around can detect if it's still within the coverage of the AP or not by using just its WURx. The clock information of the AP carried in the WUR Beacon, such as a TSF or partial TSF value of the AP, helps a STA operating in a duty-cycled WUR mode to synchronize its local TSF timer value with that of the AP, so as to maintain time synchronization with the AP with respect to when each "On" period for the STA begins and ends. Large WUR Beacon interval and small size of the WUR Beacon are desirable for minimizing the signaling overhead caused by transmitting the WUR Beacons.

However, there are still certain drawbacks of the synchronous duty-cycled mode. For example, when both a wearable device (WD) and a smartphone serving the WD (i.e., the smartphone is operating as the serving AP for the WD) need to sleep for power saving purposes, requiring the smartphone to periodically transmit WUR Beacons reduces the sleep time of the smartphone, thus increasing the power consumption of the smartphone. In addition, transmitting WUR Beacons incurs additional system overhead as the channel time occupied by WUR Beacon transmissions cannot be used for transmitting data. For example, with a ±100 parts per million (ppm) clock drift rate and a 5 milliseconds (msec) "On" period, the transmitting device needs to transmit WUR Beacons at least once every 25 seconds in order for the WURx of the receiving device to correct its clock before the clock drifts too far for the WURx to receive any WUR Beacons from the transmitting device in the first place. Furthermore, enforcing the minimal requirement without allowing for a significant margin of error may still cause the WURx to become unable to receive any subsequent WUR Beacons when the WURx occasionally misses the detection of one WUR Beacon and its clock drifts too far to be corrected by the next WUR Beacon (all arising from not being able to receive the next WUR Beacon in the first place). Furthermore, a malicious attacker seeking to deny services to a receiving device may send faked WUR Beacons with purposefully erroneous clock information to cause the WURx of the receiving device to set its clock to a wrong time, resulting in the WURx of the receiving device becoming unsynchronized with the transmitting device, such as, the WURx of the receiving device being in an "On" period at the wrong time (e.g., during a time that the transmitting device perceives as "Off" for the receiving device).

Figure 7:
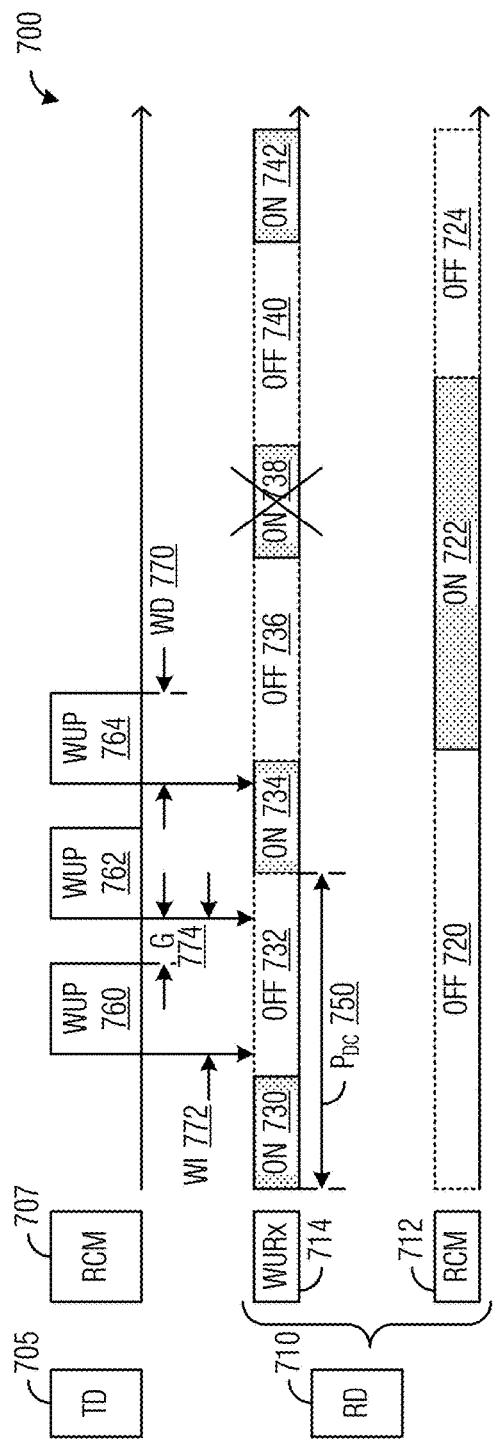
FIG. 7 illustrates a diagram of example wake-up operations in an asynchronous duty-cycled mode.

FIG. 7 illustrates a diagram 700 of example wake-up operations in an asynchronous duty-cycled mode. As shown in FIG. 7, similar to the synchronous duty-cycled mode, a WURx (such as WURx 714) of a receiving device (such as a STA) 710 operating in the asynchronous duty-cycled mode alternates between the "On" and "Off" periods in accordance with its local clock, while an RCM 712 of receiving device 710 is initially sleeping (shown as dot-lined OFF block 720). Consecutive periods comprising an "On" period followed by an "Off" period is defined as a duty-cycle. For a single WURx, the duty-cycle remains fixed until adjusted, and is defined as a combined duration of the "On" and the "Off" periods, such as $P_{DC}$ 750. During the "On" periods (shown as shaded ON blocks 730, 734, and 742), WURx 714 becomes active and listens for the wake-up packet. During the "Off" periods (shown as dot-lined OFF blocks 732, 736, and 740), WURx 714 becomes inactive and unable to receive the wake-up packet. However, the local clock of WURx 714 may not be synchronized with a remote clock of an RCM 707 of a transmitting device (such as an AP) 705 attempting to wake up RCM 712, because RCM 707 is not required to transmit any WUR Beacons. RCM 707 knows the durations of the "On", "Off", and duty-cycle periods of WURx 714, through the association or configuration procedure between the transmitting device and the receiving device, as described before, for example. However, RCM 707 may not know when an "On" period of WURx 714 starts or ends, even if the offset value is also configured between the transmitting device and the receiving device, because the clock of WURx 714 (relative to the clock of RCM 707) may have drifted and cannot be corrected without the WUR Beacons from RCM 707. In this situation, when RCM 707 needs to wake up RCM 712, RCM 707 may transmit a sequence of wake-up packets (such as WUPs 760, 762, and 764) to WURx 714 to ensure that at least one wake-up packet is transmitted during an "On" period of WURx 714 and therefore can be received by WURx 714. Co-assigned U.S. patent application Ser. No. 15/843,484, filed on Dec. 15, 2017, entitled "SYSTEM AND METHOD FOR ASYNCHRONOUS WAKE-UP MODE AND RELATED MODE SWITCHING," describes various embodiments of techniques for ensuring that at least one wake-up packet is transmitted during an "On" period of a WURx of a receiving device operating in an asynchronous duty-cycled mode, which is a duty-cycled mode that does not rely on the WUR Beacons to maintain clock synchronization between the transmitting device and the receiving device, which application is hereby incorporated herein by reference in its entirety.

Compared to the synchronous duty-cycled mode, the asynchronous duty-cycled mode usually requires the transmitting device to transmit multiple wake-up packets before one of the transmitted wake-up packets succeeds in waking up the RCM of the receiving device. On the other hand, one advantage of the asynchronous duty-cycled mode over the synchronous duty-cycled mode is that, when there are malicious attacks focussed upon clock synchronization between transmitting and receiving devices, the transmitting device is still able to wake up the RCM of the receiving device in accordance with the asynchronous duty-cycled mode. The following examples illustrate how malicious attacks on the WUR Beacon can cause the "On" periods of the receiving device, which are used by the transmitting device (to transmit the wake-up packet) and the receiving device (to receive the wake-up packet), respectively, to be totally offset from each other.

As an illustrative example, in accordance with a first attack model, an attacker may send a forged WUR Beacon with purposefully erroneous clock information (such as TSF or partial TSF value) or replay a spoofed WUR Beacon at a later time (to cause the replayed clock information to be obsolete (i.e., the clock information in the replayed WUR Beacon is no longer up to date)). An unaware receiving device receiving such forged or replayed WUR Beacon will update its local clock in accordance with the erroneous clock information, subsequently causing the "On" periods derived by the transmitting device and the WURx of the receiving device, from their respective local clocks, to be totally offset from one another. As a result, the transmitting device becomes unable to wake up the RCM of the receiving device.

In this example, employing integrity protection on the WUR Beacons may defeat the forgery attacks but not the replay attacks, because a legitimate WUR Beacon, which is transmitted by the transmitting device with a message integrity code (MIC) properly formed by hashing certain information contained in the WUR Beacon with a shared secret known only to the transmitting device and the receiving device, can be spoofed and replayed by the attacker. Normally, a replay attacker does not tamper with the MIC nor the information contained in a replayed WUR Beacon. Therefore, the replayed WUR Beacon can pass the integrity check performed by the WURx of the receiving device without requiring the attacker to have knowledge of the shared secret. An anti-replay counter, a valid range of clock information, or a combination thereof, may be used for validating an integrity-protected WUR Beacon in an effort to defeat the replay attacks.

In an embodiment, the anti-replay counter basically carries a message sequence number that is used in the MIC computation and works as follows: if the attacker replays both the sequence number and the MIC, the replay attack may be detected by a recipient who detects the same sequence number being used twice; on the other hand, if the attacker tampers with the sequence number in order to avoid the replay being detected, the copied MIC will not pass the MIC verification performed by the recipient because it was generated using a different sequence number value. However, these techniques may require the receiving device to apply a margin on the counter value, because the WURx of the receiving device may occasionally miss the detection of a legitimate WUR Beacon, or apply a margin on the clock information (such as the TSF or partial TSF value), because the clocks of the transmitting device and the receiving device may drift relative to each other during the time between consecutive WUR Beacons. These margins can be exploited by attackers in a second type of attack that is more sophisticated than the attack of the first attack model, as described above. Examples of the second type of attack are described below. Furthermore, employing the anti-replay counter or checking on the validity of the clock information contained in the WUR Beacons received would increase complexity and power consumption at the WURx.

In an embodiment, the anti-replay counter is nonce that is an arbitrary number that is used once for cryptography purposes (e.g., the nonce is used in MIC computation). The nonce is often a pseudo-random number. The nonce works in a manner similar to the message sequence number used in MIC computation discussed previously and works as follows: if the attacker replays the nonce, the replay attack may be detected by a recipient who detects the same number being used twice; on the other hand, if the attacker tampers with the nonce in order to avoid the replay being detected, the copied MIC will not pass the MIC verification performed by the recipient because it was generated using a different nonce.

In accordance with a second attack model, an attacker blocks the reception of a first WUR Beacon transmitted by the legitimate transmitting device (such as an AP), by injecting interference into the wireless channel, for example, while the attacker spoofing the first WUR Beacon. A successful attacker block ensures that the anti-replay counter of the receiving device is not incremented (by the first WUR Beacon transmitted by the legitimate transmitting device), and therefore the receiving device is still looking for a counter value equal to the counter value in the spoofed and to-be-replayed WUR Beacon. Then, the attacker replays the spoofed first WUR Beacon at a first amount of time later, when the clock information contained in the replayed WUR Beacon is still within the margin allowed for the clock drifting between the clocks of the transmitting device and the receiving device, for example, thereby passing all validations performed by the WURx of the receiving device, causing the receiving device to update its local clock, which originally might have been perfectly synchronized. After the update, the clock of the receiving device lags behind the clock of the transmitting device by the first amount of time. The attacker may repeat such attacks for subsequent WUR Beacons that are transmitted by the legitimate transmitting device, further delaying the clock of the receiving device by an additional first amount of time with each repeat attack attempt, eventually completely offsetting the "On" periods used by the transmitting device and the receiving device, respectively. After achieving the complete offsetting of the "On" periods, the attacker may continue to replay the WUR Beacons spoofed from the legitimate transmitting device, but may slow down the rate of or stop further delaying the clock of the receiving device, so that the "On" periods used by the transmitting device and the receiving device will remain offset from one another. Because the receiving device continues to receive the WUR Beacons, which are seemingly valid (due to passing all validation checks) but are actually the replayed ones, the receiving device is unaware that it has been victimized by such attacks.

In the following detailed example, the transmitting device is an AP serving a STA (acting as the receiving device) operating in the synchronous duty-cycled WUR mode. At a time X, the AP transmits a first WUR Beacon containing a TSF value of X (or a partial TSF associated with the TSF value of X), which is read from a clock of the AP. The first WUR Beacon also contains a properly formed MIC (used for integrity check, for example) and a counter value of N (for anti-replay purposes, for example). Assuming that a clock of the STA is currently perfectly synchronized (but the STA doesn't know it), the TSF value read from the STA's clock is X as well. For discussion purposes, assume that the maximal clock drifting between the AP and the STA is Y during every WUR Beacon Interval (such as WUR Beacon Interval 615 in FIG. 6). So, the STA is expecting a WUR Beacon from the AP containing a valid MIC, a counter value of Y, and a TSF value that is in between (X−Y) and (X+Y) (or a partial TSF value associated with the TSF value that is in between (X−Y) and (X+Y)).

As soon as detecting certain portion of the first WUR Beacon (such as legacy preamble 332, WUR preamble 350, a Type field of MAC header 352, etc., as illustrated in FIG. 3), the attacker injects interference signal into the wireless channel, causing the STA to miss the detection of the first WUR Beacon. For example, the STA may be unable to check a frame check sum (FCS) contained in the WUR Beacon due to the interference signal and therefore discard the received first WUR Beacon. Meanwhile, the attacker continues to spoof the remainder of the first WUR Beacon. The attacker may use beamforming, separate directional antennas, or even physically separate devices to perform spoofing and injecting interference at the same time so that its ability to spoof the first WUR Beacon is not affected by the interfering signal that it injects into the wireless channel.

At time (X+Y), the attacker replays the spoofed first WUR Beacon, which contains a TSF value of X (i.e., the time the AP transmitted the first WUR Beacon) or a partial TSF value associated with the TSF value of X. Because the STA has missed the detection of the legitimate first WUR Beacon (i.e., the first WUR Beacon as transmitted by the AP at the time X), the STA still detects for a WUR Beacon containing a counter value of N. At this time, the TSF value read from the STA's clock is (X+Y), which is also the TSF value read from the AP's clock. Thus, a TSF value (if contained in a WUR Beacon) in between X and (X+2Y) (or a partial TSF value (if contained in the WUR Beacon) that is associated with a TSF value in between X and (X+2Y)) is acceptable to the STA. So, the replayed first WUR Beacon (the replayed spoofed first WUR Beacon) passes all verifications performed by the STA using the MIC, the TSF (or partial TSF) value, and the anti-replay counter. Subsequently, the STA updates its clock to read X, which now lags behind the clock of the AP by Y.

At time (X+W), where W is the value of the WUR Beacon Interval, the AP transmits a second WUR Beacon containing a TSF value of (X+W) (or a partial TSF value associated with the TSF value of (X+W)) and a counter value of (N+1). At this time, the TSF value read from the STA's clock is (X−Y+W). Therefore, the WURx of the STA may still be off and the STA does not receive the second WUR Beacon. It is noted that even if the WURx of the STA isn't off, the attacker still can inject interference into the channel to prevent the WURx of the STA from receiving the legitimate second WUR Beacon. The attacker spoofs the legitimate second WUR Beacon and stores it.

At time (X+Y+W), the TSF value read from the STA's clock is (X+W), which, according to the STA's calculation, is the beginning of the next "On" period. Therefore, the STA's WURx is turned on and starts to detect for the second WUR Beacon containing a correctly computed MIC, a counter value of N+1, and a TSF (or partial TSF) value that is within a valid range considering the maximal clock drifting allowed.

At time (X+2Y+W), the attacker replays (transmits) the spoofed second WUR Beacon, which contains the MIC (correctly computed by the AP), a counter value of (N+1), a TSF value of (X+Y) (or a partial TSF value associated with the TSF value of (X+Y). At this time, the STA's clock reads (X+Y+W), while the AP's clock reads (X+2Y+W). So, a TSF value (if contained in a WUR Beacon) in between (X+W) and (X+2Y+W) (or a partial TSF value (is contained in the WUR Beacon) associated with a TSF value that is in between (X+W) and (X+2Y+W) is acceptable to the STA. Because the attacker didn't tamper with any information contained in the replayed (spoofed) second WUR Beacon, the MIC value, computed by the AP in accordance with the shared secret that is known only to the PA and the STA, still checks when the STA performs MIC verification. Thus, the replayed second WUR Beacon, once again, passes all verifications performed by the STA using the MIC, the TSF (or partial TSF) value, and the anti-replay counter. Subsequently, the STA updates its clock to read (X+Y), which starts to lag behind the clock of the AP by 2Y. The attacker can continue the interference injection, spoofing, and replaying process. In a specific example, assuming that the WUR Beacon Interval (W) is to seconds, the clock drifting rate of the clock of the STA relative to that of the AP is +−200 ppm, and each "On" period is to msec long, it will take only 5 replays (of consecutive WUR Beacons) to completely offset the "On" periods of the AP and the WURx of the STA.

It is noted that in both the first and second attack models, the victimized receiving device is unable to detect such attacks. Therefore, when using the synchronous duty-cycled sleeping techniques (such as WUR) in a wireless communications system, such as communications system 200 in FIG. 2, there is a need to detect any potential faked or replayed beacon signals (such as the WUR Beacon described herein) that is used for maintaining time synchronization within the wireless communications system.

One obvious choice is for an AP (such as AP 205 in FIG. 2), which serves a BSS and transmits WUR Beacons periodically, to detect such faked or replayed WUR Beacons by itself. In that case, the AP cannot perform normal communications, because detecting for potential faked or replayed WUR Beacons requires the AP to listen to the channel all the time and the AP is unable to transmit while listening without using the full-duplexing technique. Full-duplexing communications typically requires expensive hardware. Additionally, there is currently a lack of successful commercialization of the full-duplexing technique in wireless products of a small form-factor. A small form-factor deployment means that there typically isn't enough spatial separation between transmitting and receiving antennas on the same device in order to obtain sufficient isolation between the simultaneously transmitted and received signals, which is crucial for cancelling the interference of self-transmitted signal on the received signal in order to achieve full-duplexing.

In accordance with an example embodiment, the AP (acting as the transmitting device) configures one or more associated WUR-capable STAs, which are herein and hereafter referred to as the proxy STAs (due to performing functions, such as monitoring WUR Beacons, on behalf of the AP), to receive WUR Beacons transmitted by the AP (or perceived as being transmitted by the AP), i.e., the WUR Beacons containing an identifier (e.g., a PBSSID or a Transmit ID) matching the same type of identifier that is either of the AP or is associated with the AP, and to report to the AP information about the received WUR Beacons. For example, the information about the received WUR Beacons may comprise the full TSF or a first partial TSF values contained in the received WUR Beacons. For another example, due to the roll over issue described previously, the information about the received WUR Beacons may comprise second partial TSF values (herein also referred to as the reported partial TSF value), which are the first partial TSF values that the proxy STA receives (herein also referred to as the received partial TSF value) from the WUR Beacons, extended by (i.e., appended with) at least some (if not all) higher significant bits above the bits in the received partial TSF values, the higher significant bits being obtained from the local clock of the proxy station and adjusted in accordance with any occurrence of roll over determined by the proxy station. Extending the received partial TSF values with higher significant bits ensures that roll over on the reported partial TSF values will not occur within a close proximity of time, so that a false detection of a replay attack will not be declared by mistake when a roll over causes two otherwise un-extended reported partial TSF values to be equal. For yet another example, the information about the received WUR Beacons may comprise received signal quality information, such as received signal strength indication (RSSI) or any received signal energy measurement, typically expressed in dBm (i.e., decibels relative to a milliwatt), signal to noise ratio (SNR), signal plus interference to noise ratio (SINR), and so on. For yet another example, the information about the received WUR Beacons may comprise a combination of any of the above.

The report may be done periodically or when being triggered by events, such as when being requested by the AP, when the proxy STA detects that something is wrong (such as a replayed WUR Beacon), or when the proxy STA no longer needs to operate in the WUR mode or is about to exit its role as a proxy station. In an embodiment, the RCM of a proxy STA may be in an active mode, but the AP configures the proxy STA to turn on its WURx anyway in order to monitor the WUR Beacons. In another embodiment, the RCM of a proxy STA may be in the sleep mode and its WURx may be in the WUR mode and is always on. In a further embodiment, multiple proxy STAs may be enlisted by the AP to operate with their respective RCMs sleeping, their respective WURxs operating in duty-cycled mode, and their respective "On" periods configured to complement each other and collectively covering the entire time for monitoring the WUR Beacons. As an example, the "On" periods of the proxy STAs may be configured so that there is always one or more proxy STAs in an "On" period at all time. The AP may compare the reported TSF (or partial TSF) values with the TSF (or partial TSF) values actually transmitted by the AP in order to determine if a reported TSF (or partial TSF) value is faked (e.g., when the reported value does not match with any TSF (or partial TSF) value that the AP actually transmitted).

The AP may also compare the reported TSF (or partial TSF) values with one another in order to determine if a reported TSF (or partial TSF) value is replayed (e.g., when the reported value is reported as being received twice). The AP may also compare a first time interval (herein also referred to as the reception time interval) between reception times of two consecutive WUR Beacons with a second time interval (herein also referred to as the transmission time interval) between transmission times of these two consecutive WUR Beacons to determine if a WUR Beacon is received with a wrong time interval, e.g., when the difference between a reception time interval and a transmission time interval associated with a same consecutive WUR Beacon pair exceeds a threshold. For example, a threshold may be set based on the maximal clock drift that may occur on the clock of the proxy station relative to that of the AP during a period of Beacon Interval of the conventional 802.11 Beacons. It will be discussed below that the proxy station may use its RCM to receive the conventional 802.11 Beacons periodically transmitted by the AP to maintain its time synchronization and may not use any received WUR Beacons for time synchronization purpose so that the clock of proxy station will not be contaminated by the faked or replayed WUR Beacons. The conventional 802.11 Beacons are usually transmitted far more frequently than the WUR Beacons. For example, the conventional 802.11 Beacons are typically transmitted once every 100 msec (i.e., the Beacon Interval is 100 msec), while the WUR Beacons are transmitted once every to 10 seconds. Assuming the same +−200 ppm clock drift rate, the clock of the proxy station may always be within +−20 microseconds (usec) accuracy comparing to the clock of the AP, due to the ability to correct the clock once every 100 msec. Therefore, the threshold may be set to +−20 usec, or with a margin, set to +−40 usec, for example. A WUR Beacon received with a wrong time interval may be considered as a blocked-then-replayed WUR Beacon, as described in the second attack model previously. The reception time interval may be reported by the proxy station or may be determined by the AP based on the reception times reported by the proxy station. And the transmission time interval may be determined by the AP based on the TSF or partial TSF values included in the WUR Beacon transmitted, because the TSF or partial TSF value included in a WUR Beacon reflects the transmission time of the WUR Beacon. A WUR Beacon associated with the faked or replayed TSF (or partial TSF) value may be marked as an erroneous WUR Beacon.

It is noted that the proxy STA may also be able to detect an erroneous WUR Beacon by itself, and thereby reporting only the erroneous WUR Beacons, as an alternative to reporting information about every WUR Beacon received and identified by the identifier of the AP. As an example, if a received WUR Beacon has a TSF (or partial TSF) value has already been received within a close proximity of time, then proxy STA may consider that the WUR Beacon is a replayed WUR Beacon, and may thereby mark the WUR Beacon as an erroneous WUR Beacon with an error type referred to as "pure-replay" or some other similar error type reference. As another example, if a reception time interval between reception times of two consecutive WUR Beacons is significantly different from the corresponding transmission time interval computed from the TSF (or partial TSF)

values included in the two consecutive WUR Beacons, then the proxy STA may consider that the WUR Beacon is a replayed WUR Beacon after a successful blocking, and may thereby mark the WUR Beacon as an erroneous WUR Beacon with an error type referred to as "block-and-replay" or some other similar error type reference. As yet another example, if the measured RSSI of a first WUR Beacon identified by the identifier of the AP is significantly different from the measured RSSIs of the other received WUR Beacons identified by the identifier of the AP, the first WUR Beacon may have been transmitted by a different transmitting device, which may be an attacker located a different distance to the proxy STA (as compared to the distance of the legitimate AP to the proxy STA). Then, the proxy STA marks the first WUR Beacon as an erroneous WUR Beacon with an error type referred to as "abnormal-signal-quality" or some other similar error type reference. As yet another example, the proxy station may receive a large number of WUR Beacons identified by the identifier of the AP but containing MIC values that fail to pass the MIC verification. It is noted that these WUR Beacons may contain the same MIC value or different MIC values, but the MIC values do not pass MIC verification. Then, the proxy STA may mark these WUR Beacons as erroneous WUR Beacons with an error type referred to as "brute-force-attack" or some other similar error type reference. In a situation where the proxy STA has detected one or more erroneous WUR Beacons, the proxy STA may report the one or more erroneous WUR Beacons to the AP. The proxy STA may send such report immediately or following a reporting schedule configured by the AP, for example. The report to the AP may include information about each erroneous WUR Beacon, such as TSF (or partial TSF) value, counter value, or MIC value included in the erroneous WUR Beacon, the extended partial TSF value derived from the partial TSF value included in the erroneous WUR Beacon (as previously described), the reception time of the erroneous WUR Beacon, the reception time interval of the erroneous WUR Beacon from the previous WUR Beacon, and so on. Alternatively, the report to the AP may simply contain the error information, wherein the error information may include an error indication of one or more bits or a flag conveying that at least one erroneous WUR Beacons have been detected, the error types of the erroneous WUR Beacons detected, the number of erroneous WUR Beacons detected for each error type, or a combination thereof. In this situation, the AP detects the erroneous WUR Beacon directly from the error information reported by the proxy STA. It is noted that two or more WUR Beacons with the same partial TSF value but are received an extended amount of time apart may potentially be valid WUR Beacons and that their repeated partial TSF values may be due to a roll over in the counters.

In accordance with another example embodiment, in response to detecting an erroneous WUR Beacon, the AP (acting as the transmitting device) may enter the WUR operations within the BSS into a secured mode (i.e., a mode that doesn't rely on the WUR Beacon), for example, the always-on mode or the asynchronous wakeup mode, as described before (and in co-assigned U.S. application Ser. No. 15/843,484). Entering the secured mode may comprise the AP stopping the transmission of WUR Beacons and the AP indicating that it does not transmit WUR Beacons, for example, by setting the WUR Beacon Interval field in the regular Beacon frames to a pre-specified value (e.g., a value of zero or all "0" bits or a value made of all "1" bits in the WUR Beacon Interval field) or by transmitting a wake-up packet (such as wake-up packet 325) with a pre-specified wake-up identifier (e.g., the wake-up identifier made of all "0" bits or all "1" bits, or of any other value to be defined by IEEE 802.11ba Amendment) or a special Type value (e.g., a value of 4 or any other value to be specified by IEEE 802.11ba Amendment) in the MAC header (such as MAC header 352), where the pre-specified wake-up identifier or the special Type value conveys that the AP doesn't transmit WUR Beacons.

In accordance with yet another example embodiment, in response to detecting an erroneous WUR Beacon, the AP may make an attempt to recover any STA already been victimized by waking up the RCM of the STA (e.g., in accordance with the asynchronous wake-up mode), correcting the TSF value of the STA, and placing the RCM of the STA in the sleep mode and the WURx of the STA into the secured mode of WUR operation (for example, the always-on mode or the asynchronous wake-up mode as described before). Subsequently, when the AP needs to wake up the RCM of the STA, the AP wakes up the RCM of the STA in accordance with the secured mode. For example, if the AP has placed the WURx of the STA in the always-on mode, the AP may send one wake-up packet (such as wake-up packet 325) whenever the AP wants to wake up the RCM of the STA. For another example, if the AP has placed the WURx of the STA in the asynchronous duty-cycled mode, the AP may send a sequence of wake-up packets with sufficient number of wake-up packets in the sequence and with the intervals between consecutive wake-up packets meeting certain criteria, to wake-up the RCM of the STA.

In order for the AP (acting as the transmitting device) to configure an associated WUR-capable STA to operate as a proxy STA, monitoring and reporting WUR Beacons, the AP may exchange certain messages with the proxy STA. The AP may also exchange certain messages with the proxy STA to in order to request or fetch the report of received WUR Beacons from the proxy STA. These messages can be conveyed, for example, in the form of action frames, such as a Proxy Configuration Request frame transmitted from the AP to the proxy STA (e.g., for configuring a STA to operate as a proxy STA), a Proxy Configuration Response frame transmitted from the proxy STA to the AP in response to the Proxy Configuration Request frame (e.g., for accepting the role of a proxy STA), a WUR Beacon PTSF Request frame transmitted from the AP to the proxy STA (e.g., for requesting information about the WUR Beacons received by the proxy STA), and a WUR Beacon PTSF Report frame transmitted from the proxy STA to the AP (e.g., for reporting information about the WUR Beacons received by the proxy STA), etc.

Figure 8:
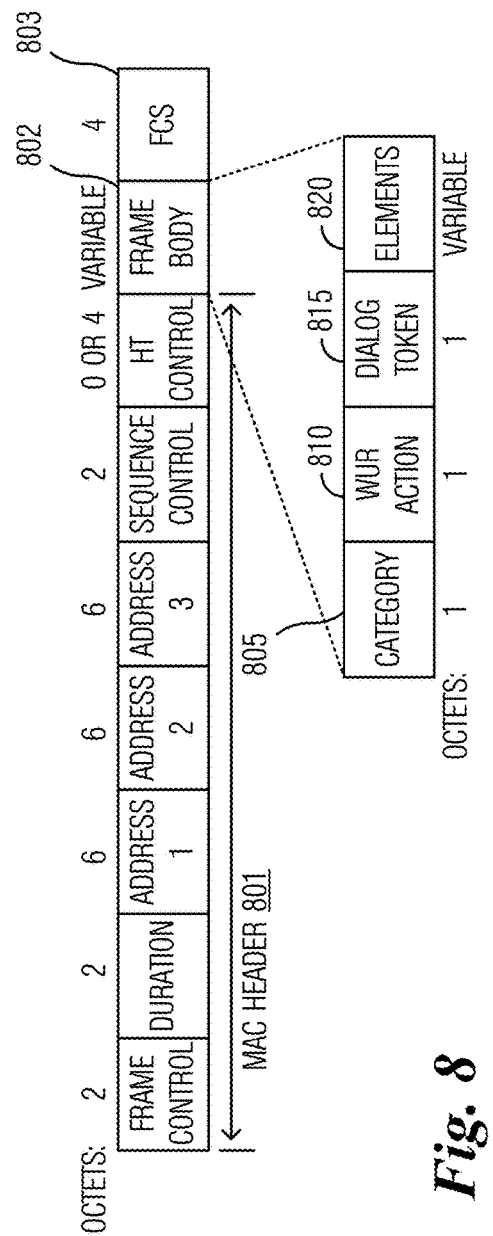
FIG. 8 illustrates an example WUR action frame format according to example embodiments described herein.

In accordance with an example embodiment, a WUR action frame is defined for conveying these various action frames. FIG. 8 illustrates an example WUR action frame 800. As shown in FIG. 8, WUR action frame 800 includes a MAC header 801, a frame body field 802, and a frame check sum (FCS) field 803. Frame body field 802 includes a Category field 805 used for conveying the category of WUR Action, a WUR Action field 810 used for conveying a specific action within the category of WUR Action, a Dialog Token field 815 as defined in clause 9.4.1.12 in IEEE Standard 802.11-2016, and an Elements field 820, which may include a Proxy Configuration element or a WUR Beacon PTSF element, as they will be described later in the discussion.

In accordance with a first embodiment, the Proxy Configuration Request frame and the Proxy Configuration Response frame are conveyed by WUR Action frame 800 with a first pre-specified WUR Action value in WUR Action field 810, while the WUR Beacon PTSF Request frame and the WUR Beacon PTSF Report frame are conveyed by WUR Action frame 800 with a second pre-specified WUR Action value in WUR Action field 810. For example, the first pre-specified WUR Action value may be 3 and the second pre-specified WUR Action value may be 4 (however, other values are possible). In this embodiment, both the Proxy Configuration Request frame and the Proxy Configuration Response frame may include, in Elements field 820, a Proxy Configuration element, which may contain a Type field with a value to convey whether the frame is the Proxy Configuration Request frame or the Proxy Configuration Response frame. For example, the Type field may be 1 bit long, with value "o" conveying that the frame is a Proxy Configuration Request frame and value "1" conveying that the frame is a Proxy Configuration Response frame (however, the opposite arrangement is also possible). And similarly, both the WUR Beacon PTSF Request frame and the WUR Beacon PTSF Report frame may include, in Elements field 820, a WUR Beacon PTSF element, which may contain a Type field with a value to convey whether the frame is the WUR Beacon PTSF Request frame and the WUR Beacon PTSF Report frame.

In accordance with a second embodiment, each one of the Proxy Configuration Request frame, the Proxy Configuration Response frame, the WUR Beacon PTSF Request frame, and the WUR Beacon PTSF Report frame may be conveyed by WUR Action frame 800 with a unique value in WUR Action field 810 pre-specified for the each one of these four action frames. In this embodiment, both the Proxy Configuration Request frame and the Proxy Configuration Response frame may include, in Elements field 820, a Proxy Configuration element. And similarly, both the WUR Beacon PTSF Request frame and the WUR Beacon PTSF Report frame may include, in Elements field 820, a WUR Beacon PTSF element. However, neither of these two elements needs to include the Type field.

Figure 9A:
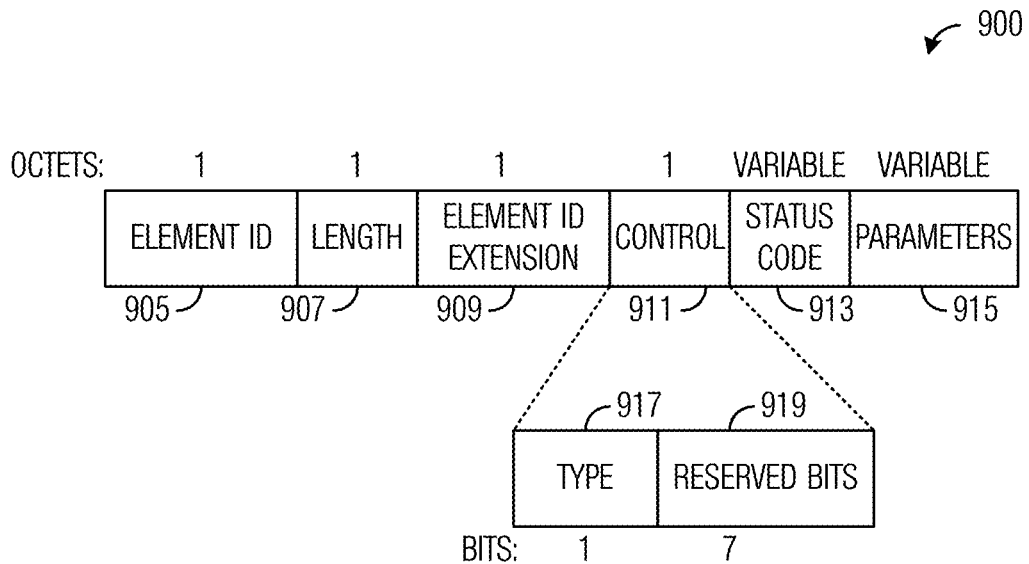
FIG. 9A illustrates a first example element format of a Proxy Configuration element according to example embodiments described herein.
Figure 9B:
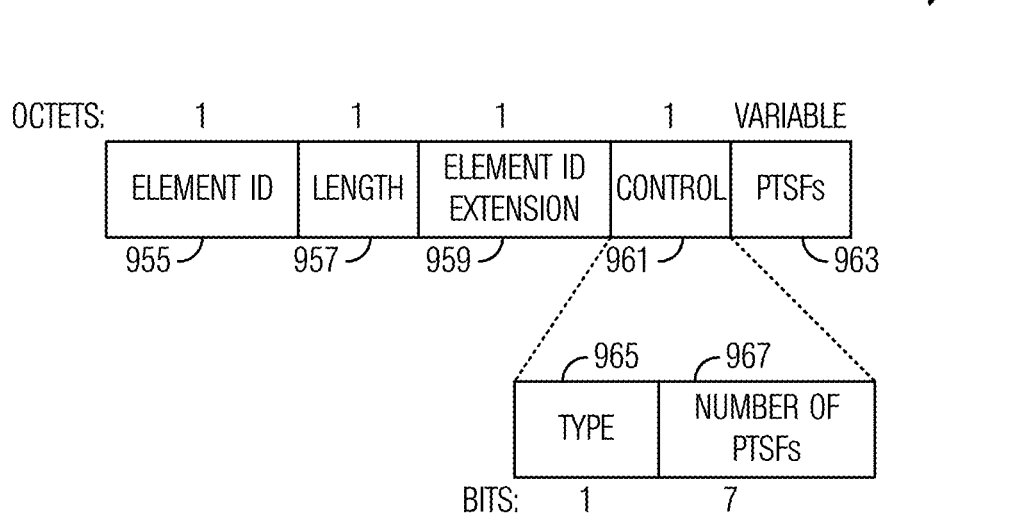
FIG. 9B illustrates a first example element format of WUR Beacon PTSF element according to example embodiments described herein.

FIGS. 9A and 9B illustrate example formats of a Proxy Configuration element 900 and a WUR Beacon PTSF element 950, respectively, in accordance with the first embodiment (i.e., when the Proxy Configuration Request frame and the Proxy Configuration Response frame are conveyed with the first pre-specified WUR Action value in WUR Action field, and the WUR Beacon PTSF Request frame and the WUR Beacon PTSF Report frame are conveyed with the second pre-specified WUR Action value in WUR Action field), as described above. As shown in FIG. 9A, Proxy Configuration element 900 includes an IE ID field 905, a Length field 907, an IE ID Extension field 909, a Control field 911, and optionally, a Status Code field 913 or a Parameters field 915. Control field 911 includes a 1-bit Type field 917 conveying that the frame is a request or response and 7 Reserved bits 919. When the value in Type field 917 conveys that the frame is a request (e.g., when the value in Type field 917 is "o", however, other values are possible), Parameters field 915 is included in element goo to convey the parameters for configuring the operations of the proxy STA, such as the identifier of the AP in the WUR Beacons that the proxy STA needs to watch for, information of the operating band or operating channel where the WUR Beacons will be transmitted, a monitoring time, a monitoring duration, a monitoring start time, a monitoring stop time, a reporting time, a reporting frequency, a reporting interval, or an event occurrence of which should trigger an immediately report by the proxy STA. Examples of the event triggering a report may include detecting an erroneous WUR Beacon or an erroneous WUR Beacon of a specific error type by the proxy STA, the termination of its operation in the WUR mode or as a proxy station, receiving a request of a report, etc. When the value in Type field 917 conveys that the frame is a response (e.g., when the value in Type field 917 is "1", however, other values are possible), Status Code field 913 is included in element 900 to convey the status of the corresponding request being accepted or rejected.

As shown in FIG. 9B, WUR Beacon PTSF element 950 includes an IE ID field 955, a Length field 957, an IE ID Extension field 959, a Control field 961, and optionally, a PTSFs field 963. Control field 961 includes a 1-bit Type field 965 conveying that the frame is a request or report and a 7-bit Number of PTSFs field 967. The value in Number of PTSFs field 967 conveys a maximal number of most recent PTSFs received and stored in the STA that the AP requests, when the value in Type field 965 conveys that the frame is a request, and conveys the number of PTSFs that the STA currently reports, when the value in Type field 965 conveys that the frame is a report. It is noted that PTSFs field 963 is included in WUR Beacon PTSF element 950 when the value in Type field 965 conveys that the frame is a report and the number of PTSFs that the STA currently reports isn't zero. It is further noted that there is a special case when the proxy STA has no WUR Beacons to be reported, for example, due to having received none. In that situation, for example, the proxy STA may convey that it is currently reporting no WUR Beacon by setting the Number of PTSFs field 967 to a value of zero, or by including, in WUR Beacon PTSF element 950, a Status Code field set to a pre-specified value (e.g., the value of 100 or any other value to be specified by IEEE 802.11ba Amendment) conveying that the proxy STA is currently reporting no WUR Beacons.

Figure 10A:
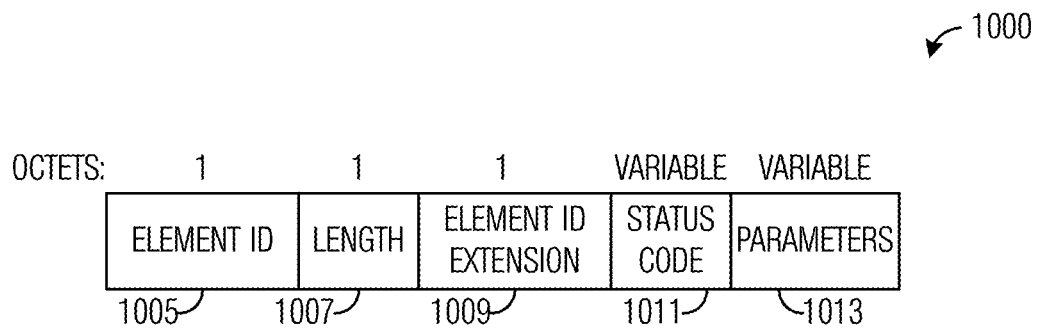
FIG. 10A illustrates a second example element format of a Proxy Configuration element according to example embodiments described herein.
Figure 10B:
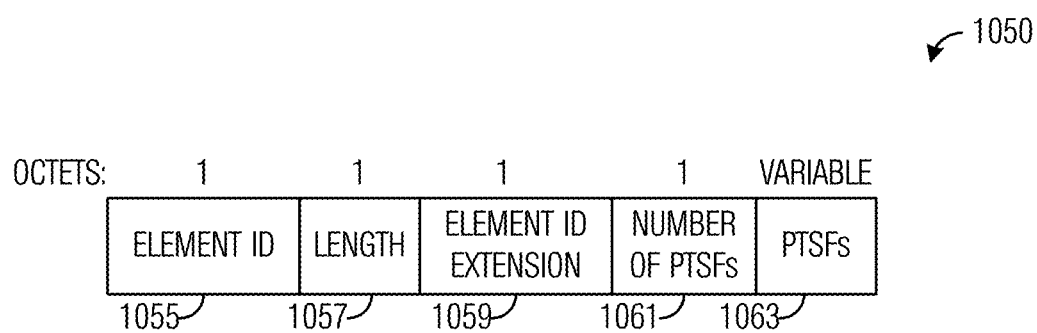
FIG. 10B illustrates a second example element format of a WUR Beacon PTSF element according to example embodiments described herein.

FIGS. 10A and 10B illustrate example formats of a Proxy Configuration element 1000 and a WUR Beacon PTSF element 1050, respectively, in accordance with the second embodiment (i.e., when each one of the Proxy Configuration Request frame, the Proxy Configuration Response frame, the WUR Beacon PTSF Request frame, and the WUR Beacon PTSF Report frame may be conveyed with a unique pre-specified value in the WUR Action field), as described above. As shown in FIG. 10A, Proxy Configuration element 1000 includes an IE ID field 1005, a Length field 1007, an IE ID Extension field 1009, and optionally, a Status Code field 1oll or a Parameters field 1013. As show in FIG. 10B, WUR Beacon PTSF element 1050 includes an IE ID field 1055, a Length field 1057, an IE ID Extension field 1059, and optionally, a Number of PTSFs field 1061 and a PTSFs field 1063. A main difference between FIGS. 10A and 9A, and between FIGS. 10B and 9B, respectively, is that there is no Type field (thus no Control field) in FIG. 10A or 10B, because in accordance with the second embodiment, the type (whether a Proxy Configuration Request frame, a Proxy Configuration Response frame, a WUR Beacon PTSF Request frame, or a WUR Beacon PTSF Report frame) has been conveyed by the value in the WUR Action field (such as WUR Action field 810 in FIG. 8). For example, when the value in the WUR Action field 810 conveys that the frame is a Proxy Configuration Request frame, Parameters field 1013 is included in element 1000 to convey the parameters for configuring the operations of the proxy STA, such as the identifier of the AP in the WUR Beacons that the proxy STA needs to watch for, information of the operating band or operating channel where the WUR Beacons will be transmitted, a monitoring time, a monitoring duration, a monitoring start time, a monitoring stop time, a reporting time, a reporting frequency, a reporting interval, or an event occurrence of which should trigger an immediately report by the proxy STA. Examples of the event triggering a report may include detecting an erroneous WUR Beacon or an erroneous WUR Beacon of a specific error type by the proxy STA, the termination of its operation in the WUR mode or as a proxy station, receiving a request of a report, etc. For another example, when the value in WUR Action field 810 conveys that the frame is a Proxy Configuration Response frame, Status Code field loll is included in element 1000 to convey the status of the corresponding Proxy Configuration Request being accepted or rejected. For yet another example, when the value in WUR Action field 810 conveys that the frame is a WUR Beacon PTSF Request frame, the value in Number of PTSFs field 1061 conveys a maximal number of most recent PTSFs received and stored in the STA that the AP requests. For yet another example, when the value in WUR Action field 810 conveys that the frame is a WUR Beacon PTSF Report frame, the value in Number of PTSFs field 1061 conveys the number of PTSFs that the STA currently reports. PTSFs field 1063 is included in WUR Beacon PTSF element 1050 when the value in WUR Action field 810 conveys that the frame is a WUR Beacon PTSF Report frame and the number of PTSFs that the STA currently reports isn't zero. When the proxy STA has no WUR Beacons to be reported, the proxy STA may convey that it is currently reporting no WUR Beacon by setting the Number of PTSFs field 1061 to a value of zero, or by including, in WUR Beacon PTSF element 1050, a Status Code field set to a pre-specified value conveying that the proxy STA is currently reporting no WUR Beacons.

Figure 11A:
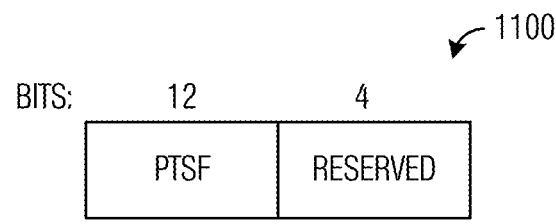
FIG. 11A illustrates an example field format of a reported Partial Timing Synchronization Function (PTSF) field according to example embodiments described herein.
Figure 11B:
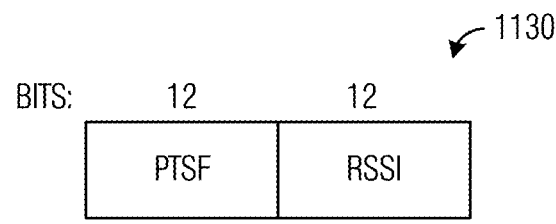
FIG. 11B illustrates an alternative example field format of the reported Partial Timing Synchronization Function (PTSF) field according to example embodiments described herein.
Figure 11C:
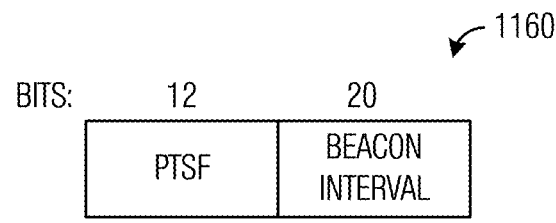
FIG. 11C illustrates yet another alternative example field format of the reported Partial Timing Synchronization Function (PTSF) field according to example embodiments described herein.

As shown in FIGS. 9B and 10B, the PTSFs field is included in the WUR Beacon PTSF element in both the first and second embodiments by the proxy STA only when reporting the information of the received WUR Beacons and the number of PTSFs that the STA currently reports isn't zero. When present, the PTSFs field contains 1 or more PTSF subfields. Each of the PTSF subfields carries a TSF value received in a WUR Beacon from the AP or carries a reported partial TSF value that is either a received partial TSF value (as received in the WUR Beacon from the AP) or the received partial TSF value extended by at least some (if not all) higher significant bits above the bits in the received partial TSF value, with the higher significant bits being obtained from the local clock of the proxy station and adjusted in accordance with any roll over determined by the proxy station. The proxy station considers a WUR Beacon to be from its AP (i.e., the AP that had configured the proxy station) if the WUR Beacon contains an identifier that matches the identifier of the AP. The PTSF subfields may be listed in the order that their corresponding WUR Beacons are received. FIGS. 11A-11C illustrate various example embodiments of the PTSF subfield, differing in the additional information included.

For example, as shown in FIG. 11A, a PTSF subfield 1100 includes a first pre-specified number of bits (e.g., a total of 12 bits ranging from Bit 19 to Bit 8, with Bit 0 representing the LSB of the 64-bit TSF value and Bit 63 representing the MSB of the 64-bit TSF value, however, other values are possible) of a TSF value, which is either directly copied from the corresponding bit positions of the TSF or partial TSF value included in the reported WUR Beacon, or is the copied value extended (by the proxy STA) by a second pre-specified number of higher significant bits (e.g., by appending Bits 23-20 to the copied Bits 19-8, however, other values are possible), the higher significant bits (e.g., Bits 23-20, however, other values are possible) being obtained from the corresponding bit positions (e.g., Bits 23-20, however, other values are possible) of the TSF value of the local clock of the proxy station and adjusted in accordance with any roll over determined by the proxy STA. In FIG. 11A, PTSF subfield 1100 may be padded with sufficient number of reserved bits to make the subfield an integer multiple of an octet.

For another example, as shown in FIG. 11B, in addition to the TSF or the reported partial TSF value of the reported WUR Beacon, a PTSF subfield 1130 also includes the RSSI measured on the reported WUR Beacon. A significant change in the measured or reported RSSI may indicate that the corresponding WUR Beacon may be transmitted by a different transmitter (such as an attacker) situated at a different location.

For yet another example, as shown in FIG. 11C, in addition to the TSF or the reported partial TSF value of the reported WUR Beacon, a PTSF subfield 1160 also includes the value of time interval measured (by the proxy STA) between the times it receives the corresponding WUR Beacon and the prior WUR Beacon. Such actually measured time interval value, when it is inconsistent with the time interval value computed from the corresponding TSF or partial TSF values included in the reported consecutive WUR Beacons, may help in detecting a replay attack that is conducted in accordance with the second attack model (i.e., block-then-replay) as described before, because the inconsistency may indicate that the actual transmission time of at least one of the WUR Beacons has been altered. And certainly, the format and content of a PTSF subfield can also take a form of a combination of the examples illustrated in FIGS. 11A-11C.

Figure 12:
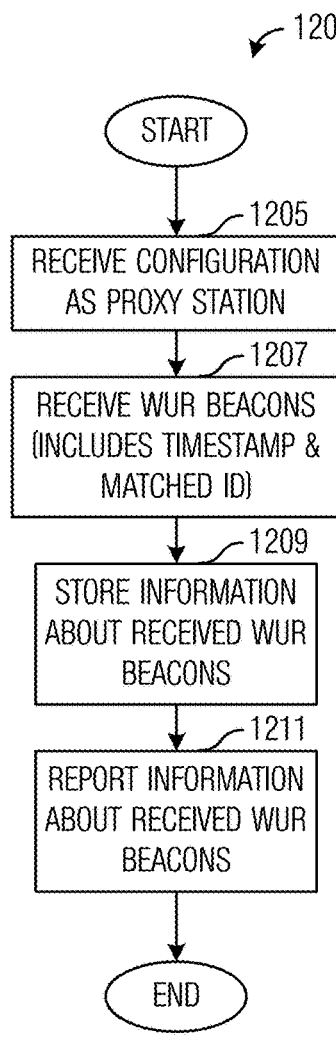
FIG. 12 illustrates a flow diagram of example operations occurring in a proxy station or proxy device supporting the monitoring and the reporting of WUR Beacons according to example embodiments described herein.

FIG. 12 illustrates a flow diagram of example operations 1200 occurring in a proxy station or proxy device supporting the monitoring and the reporting of WUR Beacons. Operations 1200 may be indicative of operations occurring in a proxy station as the proxy device monitors and reports WUR Beacons.

Operations 1200 begin with the proxy station being configured to operate as a proxy station (block 1205). The configuration of the proxy station may be performed by an AP. The proxy station may receive a Proxy Configuration Request frame from the AP. The Proxy Configuration Request frame may include information configuring the proxy station, such as an identifier of an AP specified in WUR Beacons that the proxy station should be monitoring for, an operating band or operating channel where the WUR Beacons will be transmitted, a time when to monitor, a monitoring start time, a monitoring stop time, a monitoring duration, a report time, a report frequency, a report interval, an event occurrence of which should trigger an immediately report by the proxy STA, a maximal number of WUR Beacons to report, and so on. The information may be included in a Parameters field of the Proxy Configuration Request frame. When used in such a facility, the Proxy Configuration Request frame may be referred to as a configuration message. The proxy station may send back a Proxy Configuration Response frame to the AP in response to the Proxy Configuration Response frame. The Proxy Configuration Response frame may convey the proxy station's accepting the role as a proxy station of the AP and thereby confirming the configuration of the proxy station. When used in such a facility, the Proxy Configuration Response frame may be referred to as a response message.

Once the proxy station has been configured for proxy station operation, the proxy station receives WUR Beacons transmitted by one or more APs (block 1207). In a situation where there are multiple APs operating near the vicinity of the proxy station, WUR Beacons may be transmitted by the multiple APs. The proxy station processes the WUR Beacons and obtains information, such as TSF (or partial TSF) values, as well as AP identifier, of the WUR Beacons that include an AP identifier that matches the identifier of the AP specified in the Proxy Configuration Request frame or is associated with the identifier of the AP specified in the Proxy Configuration Request frame. The proxy station may also generate information about intervals between consecutive WUR Beacons. The proxy station may also record measurements of received signal quality when the WUR Beacons are received. Examples of measurements of received signal quality include RSSI or any received signal energy measurement, typically expressed in dBm (i.e., decibels relative to a milliwatt), SNR, SINR, and so on. A single proxy station may record information for WUR Beacons with AP identifiers of or are associated with different APs. In other words, a single proxy station may be serving as a proxy station for multiple APs. The proxy station stores the information from the WUR Beacons (block 1209).

The proxy station reports the information (block 1211). The proxy station may periodically report the information associated with a particular AP identifier, as configured by the AP in block 1205. The proxy station may report the information associated with a particular AP identifier when triggered by an event. Examples of such event include the proxy station receiving a request, such as a WUR Beacon PTSF Request frame, of a report from the AP, the proxy station exiting the operation of being a proxy station, the proxy station detecting an erroneous WUR Beacon, etc. In an embodiment, the proxy station reports, to the AP, the information associated with all WUR Beacons received with the identifier of the AP so as to enable the AP to detect any erroneous WUR Beacons. The proxy station may report the information associated with a particular AP identifier in a WUR Beacon PTSF Report frame.

In another embodiment, the proxy station performs processing of the stored information about the received WUR Beacons and report information about erroneous WUR Beacons (if any are detected). As an example, the proxy station may be able to detect a relayed WUR Beacon when a received WUR Beacon has a TSF (or partial TSF) value has already been received within a close proximity of time, then the WUR Beacon is a replayed WUR Beacon. In such a situation, the proxy station may report the replayed WUR Beacon to the AP, such as in block 1211. The report to the AP may include information about the replayed WUR Beacon, including TSF (or partial TSF) value, counter value, MIC value, received time, time interval from the previously received WUR Beacon with the same TSF (or partial TSF) value, and so on. As another example, the proxy station may be able to detect WUR Beacons received at an unexpected time when an interval between receiving times of successive WUR Beacons differs substantially from intervals between transmitting times of these successive WUR Beacons, which are represented by the TSF (or partial) TSF values included in the successive WUR Beacons. In such a situation, the proxy station may report information about the WUR Beacon(s) with the different (inconsistent) intervals, such as in block 1211. As yet another example, the proxy station may be able to detect received signal qualities of WUR Beacons that are significantly different from the received signal qualities of other WUR Beacons. In such a situation, the proxy station may report information about the WUR Beacon(s) with the different received signal qualities, such as in block 1211.

Figure 13:
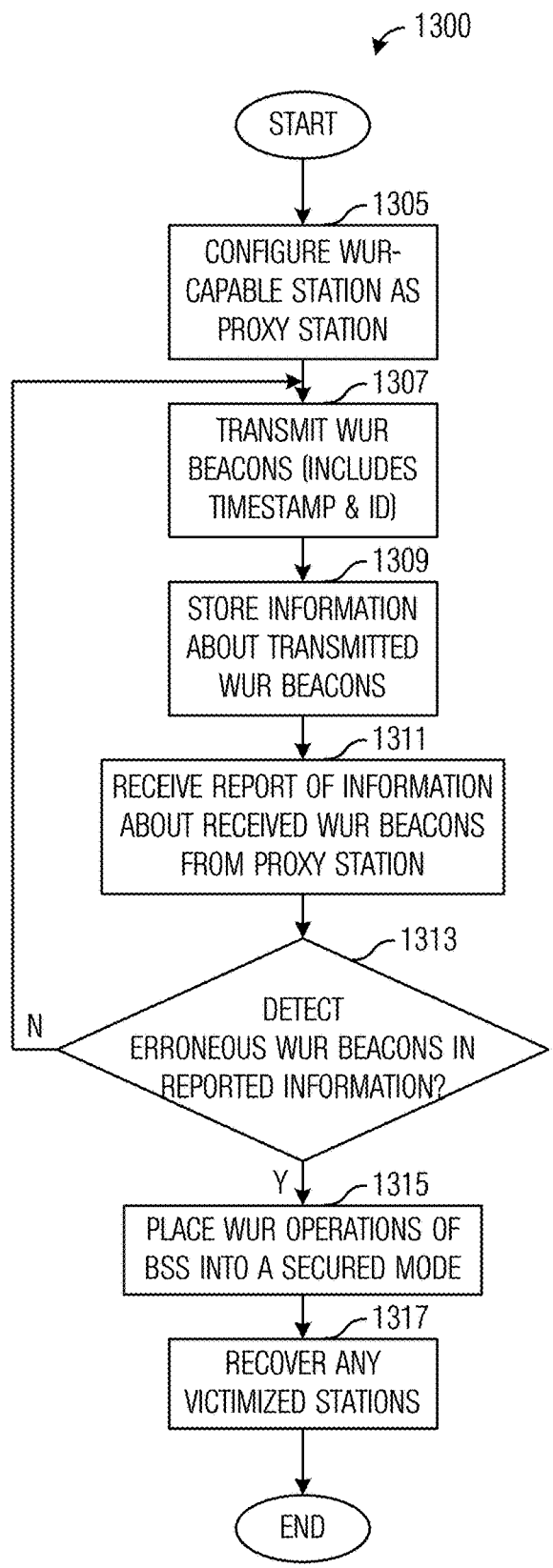
FIG. 13 illustrates a flow diagram of example operations occurring in a transmitting device supporting the detection of erroneous WUR Beacons based on reports from one or more proxy stations according to example embodiments described herein.

FIG. 13 illustrates a flow diagram of example operations 1300 occurring in a transmitting device supporting the detection of erroneous WUR Beacons based on reports from one or more proxy stations. Operations 1300 may be indicative of operations occurring in a transmitting device, such as an AP, as the transmitting device detects erroneous WUR Beacons based on reports from one or more proxy stations.

Operations 1300 begin with the transmitting device configuring a WUR-capable station to operate as a proxy station (block 1305). The transmitting device may send a Proxy Configuration Request frame to the WUR-capable station. The Proxy Configuration Request frame may include information configuring the proxy station, such as an identifier of the transmitting device specified in WUR Beacons that the proxy station should be monitoring for, an operating band or operating channel where the WUR Beacons will be transmitted, a monitoring time, a monitoring duration, a monitoring start time, a monitoring stop time, a reporting time, a reporting frequency, a reporting interval, an event occurrence of which should trigger an immediately report by the proxy STA, a maximal number of WUR Beacons to report, and so on. The information may be included in a Parameters field of a Proxy Configuration Request frame. The transmitting device may receive a Proxy Configuration Response frame from the WUR-capable station confirming the configuration of the WUR-capable station to be a proxy station.

The transmitting device transmits WUR Beacons (block 1307). The WUR Beacons may include a clock information (such as a TSF or partial TSF value) of the transmitting device, an identifier (ID) of the transmitting device, and so on. The transmitting device stores information about each of the WUR Beacons that it transmitted (block 1309). The information stored by the transmitting device may include a clock information (such as a TSF or partial TSF value, which marks the transmission time of the WUR Beacon being transmitted), a MIC value, and a value of the anti-replay counter in each of the transmitted WUR Beacons, the transmission time interval between consecutive WUR Beacons, and so on.

The transmitting device receives information about received WUR Beacons from one or more proxy stations (block 1311). The transmitting device may trigger the one or more proxy stations to send the information about the received WUR Beacons by sending a WUR Beacon PTSF Request frame, for example. The transmitting device may have also configured the one or more proxy stations to periodically send the information about the received WUR Beacons. In such a situation, the transmitting device does not have to trigger the sending of the information. The transmitting device processes the information about the received WUR Beacons and performs a check to determine if any erroneous WUR Beacon(s) were detected or reported in the reported information (block 1313). The processing of the information may involve checking the TSF (or partial TSF) values in the reported information against the TSF (or partial TSF) values in information stored by the transmitting device. As an example, if there is a TSF (or partial TSF) value in the reported information that does not match up with any TSF (or partial TSF) value in the stored information, then an erroneous WUR Beacon (a forgery attack) was detected. As an example, the processing of the information may involve checking the TSF (or partial TSF) values in the reported information against one another. As an example, if there are two or more equal TSF (or partial TSF) values in the reported information, then an erroneous WUR Beacon (a replay attack) was detected. The processing of the information may involve checking the time intervals (the receiving time intervals) in the reported information against the time intervals (the transmitting time intervals) between corresponding WUR Beacons are transmitted, the receiving time intervals being measured between consecutive WUR Beacons by the proxy station, the transmitting time intervals being determining from the TSF (or partial TSF) values included in the corresponding WUR Beacons. As an example, if there is any receiving time interval between consecutive WUR Beacons that is significantly different from the corresponding transmitting time intervals, then an erroneous WUR Beacon (a block-then-replay attack, which is in accordance with the second attack model as described before) may have been detected. The processing of the information may involve checking information conveying the received signal quality in the reported information against one another. As an example, if a reported signal quality for one or more of the WUR Beacons is significantly different from the reported signal quality for remaining WUR Beacons, then an erroneous WUR Beacon (a second transmitting device, i.e., an attacker) may have been detected. In other words, if the processing of the information about the received WUR Beacons results in any of the multiple instances of erroneous WUR Beacon being detected, then an erroneous WUR Beacon was detected or may have been detected. Hence, an overall erroneous WUR Beacon detection result may be viewed as a logical OR of multiple erroneous WUR Beacon detection results. As an example, if any of a combination of different criterion for detecting an erroneous WUR Beacon occurs, then an erroneous WUR Beacon has been detected. Detailed discussions of different processing of the information are provided below.

In an embodiment, the proxy station performs processing of information about received WUR Beacons and reports information about any erroneous WUR Beacon that it is able to detect. In such a situation, the transmitting device may not need to perform erroneous WUR Beacon detection by processing the reported timing information or signal quality information. Instead, the processing of the reported information may involve checking only an error information included in the report. The error information may comprise: 1) an error indication or flag; 2) an error type field comprising a bitmap of indication bits for respective error types (the error types being previously described), wherein an indication bit within the bitmap is set if an erroneous WUR Beacon associated with the corresponding error type has been detected, and reset, otherwise; 3) one or more number fields conveying the number of erroneous WUR Beacons being detected for one or more respective error types; or 4) a combination thereof. As an example, if an error indication conveys that at least one erroneous WUR Beacon has been detected, then an erroneous WUR Beacon may have been detected. As another example, if at least one indication bit within the bitmap in the error type field is set, then an erroneous WUR Beacon may have been detected. As yet another example, if at least one number field associated with a specific error type contains a non-zero value, then an erroneous WUR Beacon may have been detected. In another embodiment, the proxy station reports both information about received WUR Beacons and any erroneous WUR Beacon that it is able to detect. In such a situation, the transmitting device processes the reported information to detect erroneous WUR Beacons in addition to processing any information about erroneous WUR Beacons detected by the proxy station.

If no erroneous WUR Beacons are detected in the reported information, the transmitting device returns to block 1307 to continue transmitting WUR Beacons. If one or more erroneous WUR Beacons have been detected in the reported information, the transmitting device places WUR operations in the communications system that it serves into a secured mode (block 1315). Examples of secured mode include a mode that can operate without the WUR Beacons, for example, an always-on mode or an asynchronous wake-up mode. The transmitting device attempts to recover any victimized receiving station (block 1317). As an example, the transmitting device may wake up a victimized receiving station, correct its timing, place it into the secured mode of WUR operation, and wake it up in accordance with the secured mode of WUR operation when needed.

Figure 14A:
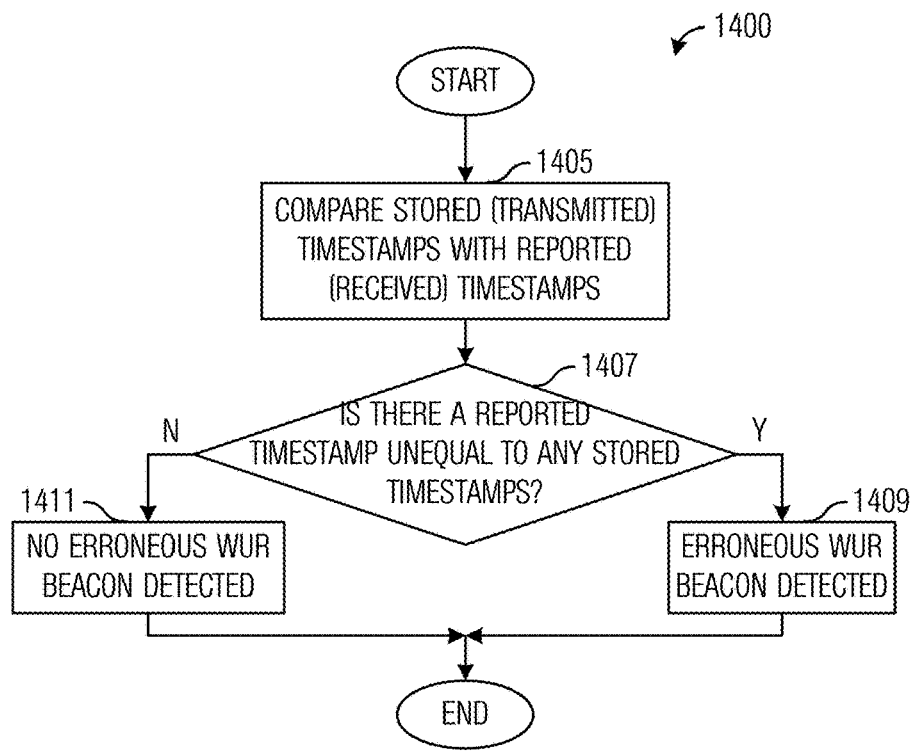
FIG. 14A illustrates a flow diagram of example operations occurring in a transmitting device detecting erroneous WUR Beacons in reported information based on a comparison of reported and stored timestamp information according to example embodiments described herein.

FIG. 14A illustrates a flow diagram of example operations 1400 occurring in a transmitting device detecting erroneous WUR Beacons in reported information based on a comparison of reported and stored clock information (timestamps). Operations 1400 may be indicative of operations occurring in a transmitting device as the transmitting device detects erroneous WUR Beacons in reported information about WUR Beacons in accordance with a comparison of reported timestamps and stored timestamps. Operations 1400 may be an example implementation of erroneous WUR Beacon detection, such as block 1313 of FIG. 13.

Operations 1400 begin with the transmitting device comparing stored time stamps (e.g., the TSF or partial TSF values included in WUR Beacons transmitted by the transmitting device) with received time stamps (the reported timestamps) (e.g., the TSF values in the WUR Beacons received by one or more proxy stations and reported to the transmitted device) or the reported partial TSF values that are either the partial TSF values included in the WUR Beacons or the partial TSF values included in the WUR Beacons, extended by at least some (if not all) higher significant bits above the bits in the partial TSF values by the proxy station (block 1405). The transmitting device performs a check to determine if there is any reported timestamps that is unequal to any stored timestamps (block 1407). Generally, if a reported timestamp is unequal to any stored timestamps, then a faked WUR Beacon was received by the reporting proxy station. If there is a reported timestamp that is unequal to any stored timestamps, then the transmitting device has detected an erroneous WUR Beacon (block 1409). If there is no reported timestamp that is unequal to any stored timestamps, then the transmitted device has not detected an erroneous WUR Beacon (block 1411).

Figure 14B:
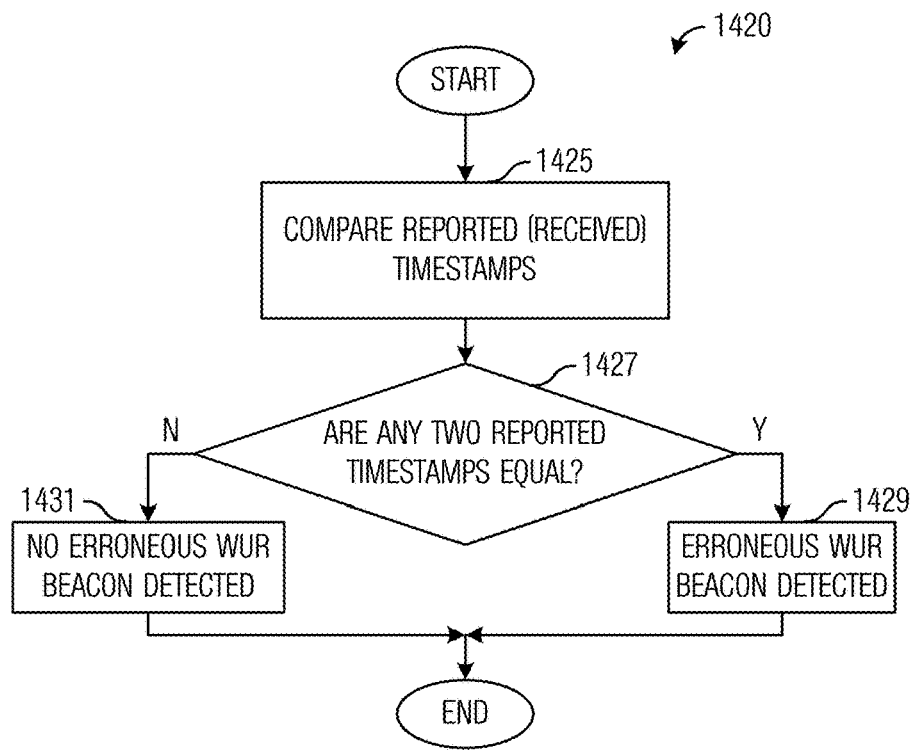
FIG. 14B illustrates a flow diagram of example operations occurring in a transmitting device detecting erroneous WUR Beacons in reported information based on a comparison of reported timestamp information according to example embodiments described herein.

FIG. 14B illustrates a flow diagram of example operations 1420 occurring in a transmitting device detecting erroneous WUR Beacons in reported information based on a comparison of reported timestamps. Operations 1420 may be indicative of operations occurring in a transmitting device as the transmitting device detects erroneous WUR Beacons in reported information about WUR Beacons in accordance with a comparison of reported timestamps. Operations 1420 may be an example implementation of erroneous WUR Beacon detection, such as block 1313 of FIG. 13.

Operations 1420 begin with the transmitting device comparing received timestamp information (i.e., timestamp information of WUR Beacons received by one or more proxy stations and reported to the transmitted device) (block 1405). As an example, the transmitting device compares the received timestamp information reported by a single proxy station. The transmitting device performs a check to determine if there is duplicated timestamps information (block 1407). Generally, if there is duplicated timestamp information, then a WUR Beacon was received twice (or more times) by one proxy station, potentially revealing a replay attack. If there is duplicated timestamp information, then the transmitting device has detected an erroneous WUR Beacon (block 1429). If there are no duplicated timestamp information, then the transmitting device has not detected an erroneous WUR Beacon (block 1431).

Figure 14C:
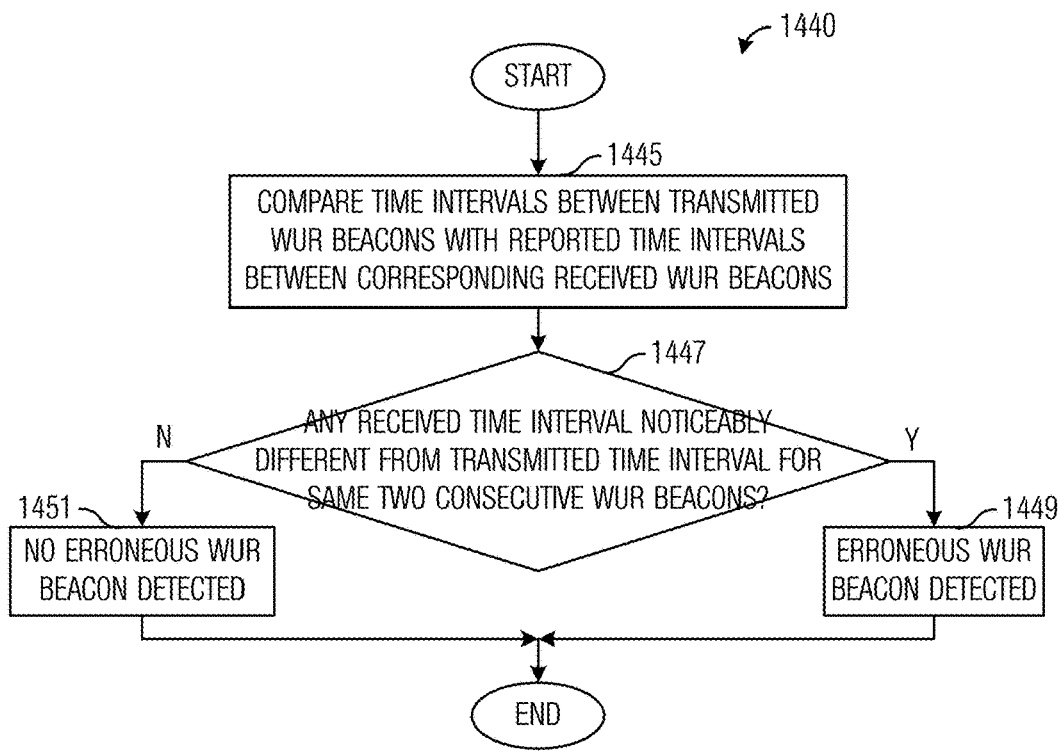
FIG. 14C illustrates a flow diagram of example operations occurring in a transmitting device detecting erroneous WUR Beacons in reported information based on a comparison of time intervals according to example embodiments described herein.

FIG. 14C illustrates a flow diagram of example operations 1440 occurring in a transmitting device detecting erroneous WUR Beacons in reported information based on a comparison of time intervals. Operations 1440 may be indicative of operations occurring in a transmitting device as the transmitting device detects erroneous WUR Beacons in reported information about WUR Beacons in accordance with a comparison of time intervals between WUR Beacons. Operations 1440 may be an example implementation of erroneous WUR Beacon detection, such as block 1313 of FIG. 13.

Operations 1440 begin with the transmitting device comparing stored time intervals information (i.e., time interval information of WUR Beacons transmitted by the transmitting device) with received time intervals information (i.e., time interval information of WUR Beacons received by one or more proxy stations and reported to the transmitted device) (block 1445). The time interval information (measured or derived by the transmitted device) may be stored by the transmitting device and the time interval information (measured or derived by the proxy station) may be received from the proxy station(s). The time interval information stored by the AP may be derived from timestamp information of the AP, which are included in the transmitted WUR Beacons and may also be read directly from the local clock of the AP when each of the WUR Beacons is transmitted. The time interval information between the received WUR Beacons may be derived from timestamp information read from the local clock of the proxy station.

As described previously, to prevent its local clock from being contaminated by any faked or replayed WUR Beacons, the proxy station may not use the WUR Beacons to synchronize its local clock with that of the AP. Instead, the proxy station may keep its RCM on or turn its RCM on periodically in order to receive the conventional 802.11 Beacon frames, which are periodically transmitted by the AP using the conventional wide channel bandwidth (such as 20 MHz) and OFDM-modulated signal, so that the proxy station can use the timestamp information contained in the convention 802.11 Beacon to synchronize its local clock with that of the AP. In this way, the local clock of the proxy station isn't affected by any faked or replayed WUR Beacons, therefore maintaining its accuracy to serve as a time reference for measuring the time interval between the arrival times of the received WUR Beacons. The AP may even periodically transmit the timestamp information of the AP to one or more proxy stations using a secured signaling mechanism with a wide channel bandwidth (such as 20 MHz) and OFDM modulation, such as using a management frame protected with encryption and integrity verification code (e.g., the MIC). In this way, the clock of the proxy station is synchronized only with an authentic time source, i.e., the clock of the AP, thus an attacker is unable to fool the proxy station by faking or replaying the convention 802.11 Beacon transmitted by the AP.

The transmitting device performs a check to determine if there is any received time interval noticeably different from stored time interval information for the same pair of consecutive WUR Beacons (block 1447). Generally, if there are differences in the time interval information for the same consecutive WUR Beacons, then a WUR Beacon may have been (blocked and then) replayed by an attacker. A certain amount of difference in the time intervals may be permissible to compensate for clock differences, propagation delay, and so on. If there is a received time interval that is noticeably different from a stored time interval for the same consecutive WUR Beacon pair, then the transmitting device has detected an erroneous WUR Beacon (block 1449). If there is no received time interval that is noticeably different from a stored time interval for the same consecutive WUR Beacon pair, then the transmitted device has not detected an erroneous WUR Beacon (block 1451).

Figure 14D:
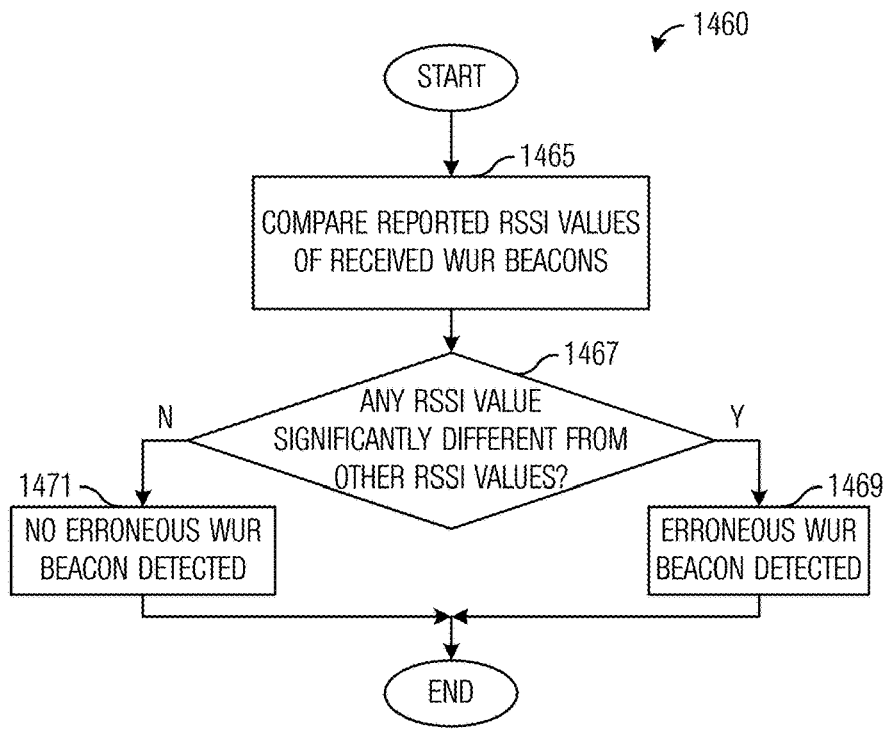
FIG. 14D illustrates a flow diagram of example operations occurring in a transmitting device detecting erroneous WUR Beacons in reported information based on a comparison of signal quality according to example embodiments described herein.

FIG. 14D illustrates a flow diagram of example operations 1460 occurring in a transmitting device detecting erroneous WUR Beacons in reported information based on a comparison of signal quality. Operations 1460 may be indicative of operations occurring in a transmitting device as the transmitting device detects erroneous WUR Beacons in reported information about WUR Beacons in accordance with a comparison of signal quality of WUR Beacons. Operations 1460 may be an example implementation of erroneous WUR Beacon detection, such as block 1313 of FIG. 13.

Operations 1460 begin with the comparing reported signal quality (e.g., RSSI, SNR, SINR, and so on) values of received WUR Beacons (block 1465). The transmitting device performs a check to determine if there are is a reported signal quality value that is significantly different from other reported signal quality values (block 1467). Generally, if there is a significant difference in the reported signal quality value for one or more WUR Beacons, when compared with the reported signal quality value for other WUR Beacons (all purportedly coming from a single transmitting device), then a second transmitting device (e.g., an attacker) may have been detected. It is noted that the signal quality values may be dynamic in nature, so a threshold (such as 10 dB, for example) may be used to compensate for changing channel condition and measurement accuracy. If there is one or more reported signal quality values that are significantly different from other reported signal quality values, then the transmitting device has detected an erroneous WUR Beacon (block 1469). If there are no reported signal quality values that are significantly different from other reported signal quality values, then the transmitting device has not detected an erroneous WUR Beacon (block 1471).

It is noted that the detection of erroneous WUR Beacons is applied on a per transmitting device basis. Furthermore, the detection of erroneous WUR Beacons is applied on a per proxy station basis. In other words, the processing of information about the received WUR Beacons is for individual transmitting devices and information about received WUR Beacons transmitted by different transmitting devices cannot typically be combined. Furthermore, in a situation where a single transmitting device has configured a plurality of proxy stations, the information about received WUR Beacons from each proxy station is processed separately. However, time information, such as time intervals and timestamps, associated with a single transmitting device, but received from multiple proxy stations may be compared to help detect erroneous WUR Beacons. For example, if a first proxy station reports that a first time interval between a pair of WUR Beacons is K milliseconds, but a second proxy station reports that a second time interval between the same pair of WUR Beacons is L milliseconds (where K is significantly different from L), then an erroneous WUR Beacon may have been detected.

Although the discussion presented herein focuses on examples involving WUR Beacons, which is currently being specified in the 802.11ba Amendment by the Task Group ba (TGba) of IEEE 802.11 Working Group, the principles illustrated in the embodiment techniques described herein can also be applied for detecting any faked or replayed conventional Beacon. The conventional Beacons are transmitted using the conventional 802.11 signaling format and carries a full 64-bit TSF value, as specified in the IEEE Standard 802.11-2016. The full 64-bit TSF value is used by the RCMs of the STAs for updating their respective TSF timers. The timers are then used for providing timing for many operations at the RCMs of the STAs. For example, any duty-cycle based power saving operation at the RCM of the STA relies on the premise that the AP and the RCM of the STA use the same timings (i.e., the starting times and ending times) for the On and Off periods so that the AP can communicate with the RCM of the STA during the On periods. The Target Wait Time (TWT) is one such example power saving technique specified in the IEEE Standard 802.11ah-2016, which is an Amendment to the IEEE Standard 802.11-2016. If an attacker transmits a faked conventional Beacon with a purposefully erroneous full 64-bit TSF value (or a replayed conventional Beacon with an equivalent effect on the TSF value carried therein), it can cause the STA and the legitimate AP to be out of time synchronization, and thereby, unable to communicate with one another. Therefore, there is a need for detecting such faked or replayed conventional Beacon as well.

As described before, the conventional 802.11 Beacons are transmitted with the conventional 802.11 signaling format, such as with a signaling bandwidth of 20 MHz or more and with the modulation scheme of orthogonal frequency division multiplexing (OFDM). Therefore, in theory, if an attacker transmits a faked or replayed conventional Beacon, the AP can use its RCM to detect for it. However, the attacker can purposefully position itself to be close enough to a STA (to victimize the STA) and yet too far from the AP for the AP to detect the faked or replayed conventional Beacon. For example, the attacker can position itself to be near the edge of (but yet outside) the coverage provided by the AP. In this situation, the AP can configure one or more of its (authenticated) STAs to be its proxy stations, and use their respective RCMs to: detect for any conventional Beacons received; report information about one or more received conventional Beacons; and determine erroneous conventional Beacon(s), if there is a necessity for reporting, back to the AP. Examples of the information include timing information, signal quality information, error information, or a combination thereof, as described previously. For example, the AP may execute the steps similar to the ones described previously and illustrated in FIGS. 13 and 14A-14D, and the proxy station may execute the steps similar to the ones described previously and illustrated in FIG. 13, except that the conventional 802.11 Beacon is received with the RCM of the STA and the STA that the AP configures to perform as the proxy station doesn't have to be capable of receiving WUR signals.

In order to ensure that the TSF timer of a proxy station is not polluted by any potential faked conventional Beacons, in one embodiment, the AP may, through the proxy configuration (similar to block 1305), instruct the proxy station not to use the full 64-bit TSF value received in a conventional Beacon (which includes an Address 2 (also referred to as Transmitter Address or TA for short) field containing the BSSID (i.e., the MAC address) of the AP) to update the TSF timer of the proxy station. In this embodiment, the AP may periodically transmit integrity-protected action frames carrying a TSF value of the AP to the proxy station. The proxy station would first check the integrity of the received action frame, by calculating a MIC with the information contained in the received action frame and a secret key shared between the AP and the proxy station, and then comparing the calculated MIC value with a MIC value contained in the received action frame. If the two MICs match, the proxy station updates its TSF timer value with the TSF value received in the action frame. Otherwise, if the two MICs do not match, the proxy station discards the action frame. In the later case, the proxy station may send a negative acknowledgement to the AP, requesting the AP to send another action frame containing an updated TSF value of the AP to the proxy station.

In order to ensure that the TSF timer of a proxy station is not polluted by any potential faked conventional Beacons, in another embodiment, the proxy station first determines whether a convention Beacon containing the MAC address of the AP is considered as good or erroneous (or at least suspicious). If the received convention Beacon is considered as erroneous, the proxy station will not update its TSF timer. Otherwise, if the received conventional Beacon is considered as good, the proxy station updates its TSF Timer with the TSF value received in the conventional Beacon. For example, if the TSF value contained in a currently received conventional Beacon differs from the TSF value read from the local TSF timer of the proxy station by too large a time margin, e.g., exceeding the maximal clock drift allowed over the time period since the previously received convention Beacon that is considered as good (i.e., the maximal clock drafting rate multiplied by the time period), then the currently received conventional Beacon is considered as erroneous. Otherwise, it is considered as good. For another example, if the signal quality in a currently received conventional Beacon differs from the average signal quality of previously received conventional Beacons that are considered as good by too large a quality margin, e.g., exceeding 10 dB, then the currently received conventional Beacon is considered as erroneous. Otherwise, it is considered as good.

Although the discussion presented herein focuses on examples using IEEE 802.11 radio access technology, the embodiment techniques described herein can also be applied to other radio access technologies utilizing wake-up radio or pre-configured duty-cycle as means to reduce power consumption of a radio communications module, such as Bluetooth, Bluetooth Low Energy (BLE), IEEE 802.15.4/ZigBee, 3GPP Long Term Evolution (LTE), LTE-Unlicensed (LTE-U), Licensed Assisted Access (LAA), MuLTEFire, 5G New Radio (NR), etc.

Figure 15:
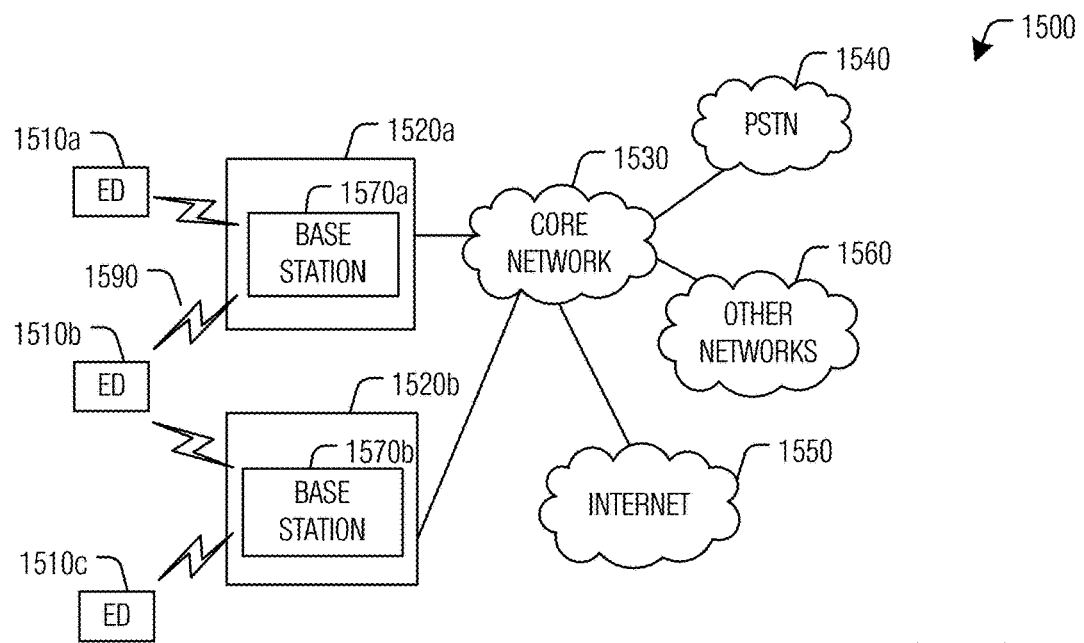
FIG. 15 illustrates an example communication system according to example embodiments described herein.

FIG. 15 illustrates an example communication system 1500. In general, the system 1500 enables multiple wireless or wired users to transmit and receive data and other content. The system 1500 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 1500 includes electronic devices (ED) 1510a-1510c, radio access networks (RANs) 1520a-1520b, a core network 1530, a public switched telephone network (PSTN) 1540, the Internet 1550, and other networks 1560. Stations and WUR-capable stations are examples of EDs, and wireless local area networks (WLANs) are examples of RANs. While certain numbers of these components or elements are shown in FIG. 15, any number of these components or elements may be included in the system 1500.

The EDs 1510a-1510c are configured to operate or communicate in the system 1500. For example, the EDs 1510a-1510c are configured to transmit or receive via wireless or wired communication channels. Each ED 1510a-1510c represents any suitable end user device and may include such devices (or may be referred to) as a user equipment or device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1520a-1520b here include base stations 1570a-1570b, respectively. APs are examples of base stations. Each base station 1570a-1570b is configured to wirelessly interface with one or more of the EDs 1510a-1510c to enable access to the core network 1530, the PSTN 1540, the Internet 1550, or the other networks 1560. For example, the base stations 1570a-1570b may include (or be) one or more of several well-known devices, such as a base transceiver station (BTS), a Node-B (NodeB), an evolved NodeB (eNodeB), a Home NodeB, a Home eNodeB, a site controller, an AP, or a wireless router. The EDs 1510a-1510c are configured to interface and communicate with the Internet 1550 and may access the core network 1530, the PSTN 1540, or the other networks 1560.

In the embodiment shown in FIG. 15, the base station 1570a forms part of the RAN 1520a, which may include other base stations, elements, or devices. Also, the base station 1570b forms part of the RAN 1520b, which may include other base stations, elements, or devices. Each base station 1570a-1570b operates to transmit or receive wireless signals within a particular geographic region or area, sometimes referred to as a "cell." In some embodiments, multiple-input multiple-output (MIMO) technology may be employed having multiple transceivers for each cell.

The base stations 1570a-1570b communicate with one or more of the EDs 1510a-1510c over one or more air interfaces 1590 using wireless communication links. The air interfaces 1590 may utilize any suitable radio access technology.

It is contemplated that the system 1500 may use multiple channel access functionality, including such schemes as described above. In particular embodiments, the base stations and EDs implement LTE, LTE-A, or LTE-B. Of course, other multiple access schemes and wireless protocols may be utilized.

The RANs 1520a-1520b are in communication with the core network 1530 to provide the EDs 1510a-1510c with voice, data, application, Voice over Internet Protocol (VoIP), or other services. Understandably, the RANs 1520a-1520b or the core network 1530 may be in direct or indirect communication with one or more other RANs (not shown). The core network 1530 may also serve as a gateway access for other networks (such as the PSTN 1540, the Internet 1550, and the other networks 1560). In addition, some or all of the EDs 1510a-1510c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1550.

Although FIG. 15 illustrates one example of a communication system, various changes may be made to FIG. 15. For example, the communication system 1500 could include any number of EDs, base stations, networks, or other components in any suitable configuration.

Figure 16A:
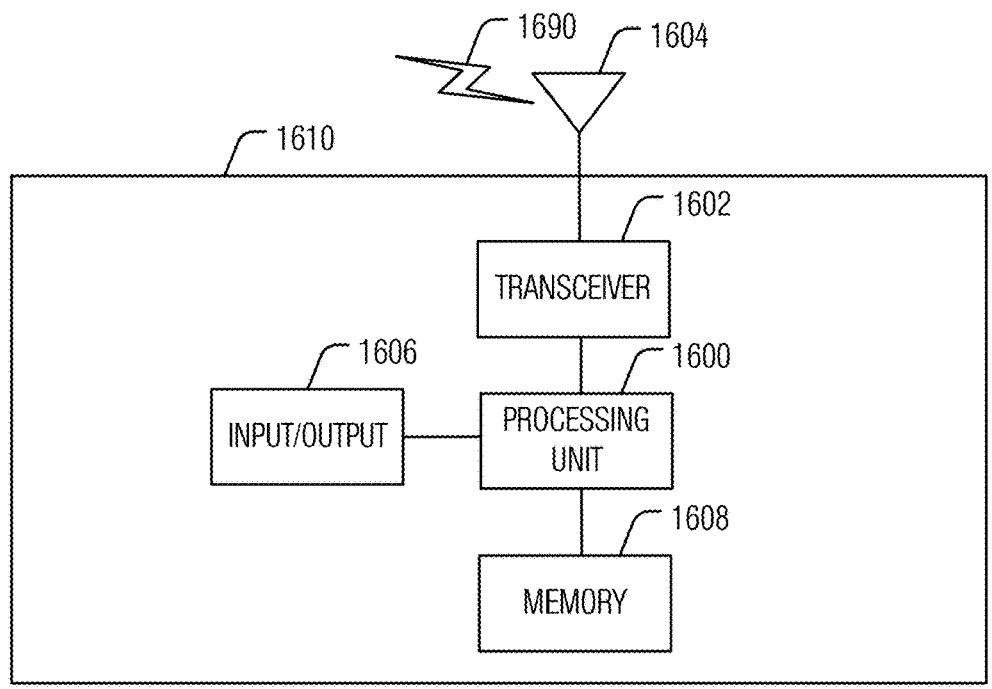
FIGS. 16A and 16B illustrate example devices that may implement the methods and teachings according to this disclosure.
Figure 16B:
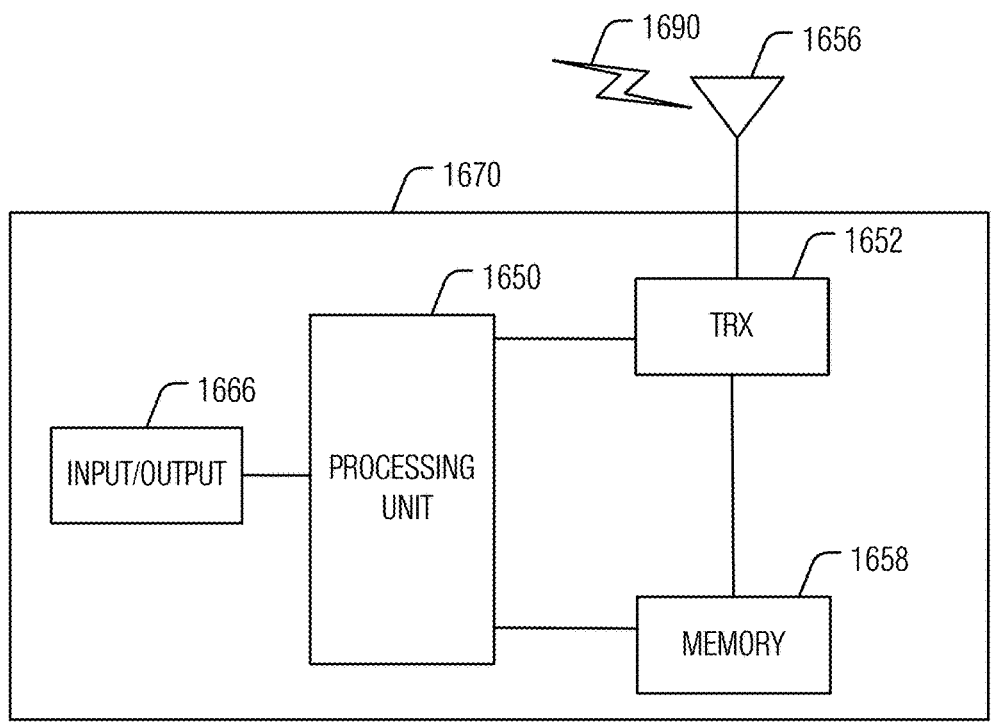

FIGS. 16A and 16B illustrate example devices that may implement the methods and teachings according to this disclosure. In particular, FIG. 16A illustrates an example ED 1610, and FIG. 16B illustrates an example base station 1670. These components could be used in the system 1500 or in any other suitable system.

As shown in FIG. 16A, the ED 1610 includes at least one processing unit 1600. The processing unit 1600 implements various processing operations of the ED 1610. For example, the processing unit 1600 could perform signal coding, data processing, power control, input/output processing, or any other functionality enabling the ED 1610 to operate in the system 1500. The processing unit 1600 also supports the methods and teachings described in more detail above. Each processing unit 1600 includes any suitable processing or computing device configured to perform one or more operations. Each processing unit 1600 could, for example, include a microprocessor, microcontroller, digital signal processor, field programmable gate array, or application specific integrated circuit.

The ED 1610 also includes at least one transceiver 1602. The transceiver 1602 is configured to modulate data or other content for transmission by at least one antenna or NIC (Network Interface Controller) 1604. The transceiver 1602 is also configured to demodulate data or other content received by the at least one antenna 1604. One of the transceivers 1602 is configured to operate as a LP-WUR receiver (i.e., it is configured to receive a wake-up packet addressed to ED 1610 and to wake up another of the transceivers 1602 upon receiving the wake-up packet). Each transceiver 1602 includes any suitable structure for generating signals for wireless or wired transmission or processing signals received wirelessly or by wire. Each antenna 1604 includes any suitable structure for transmitting or receiving wireless or wired signals. One or multiple transceivers 1602 could be used in the ED 1610, and one or multiple antennas 1604 could be used in the ED 1610. Although shown as a single functional unit, a transceiver 1602 could also be implemented using at least one transceiver and at least one separate receiver, wherein the at least one transceiver and the at least one separate receiver are capable of being separately powered on or off in order to facilitating power saving in accordance with various embodiments described herein. Although shown as a single functional unit, a processing unit 1600 could also be implemented using at least one processing unit associated with the at least one transceiver and at least one separate processing unit associated with the at least one separate receiver, wherein the at least one processing unit and the at least one separate processing unit are capable of being separately powered on or off in order to facilitating power saving in accordance with various embodiments described herein.

The ED 1610 further includes one or more input/output devices 1606 or interfaces (such as a wired interface to the Internet 1550). The input/output devices 1606 facilitate interaction with a user or other devices (network communications) in the network. Each input/output device 1606 includes any suitable structure for providing information to or receiving information from a user, such as a speaker, microphone, keypad, keyboard, display, or touch screen, including network interface communications.

In addition, the ED 1610 includes at least one memory 1608. The memory 1608 stores instructions and data used, generated, or collected by the ED 1610. For example, the memory 1608 could store software or firmware instructions executed by the processing unit(s) 1600 and data used to reduce or eliminate interference in incoming signals. Each memory 1608 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. Although shown as a single functional unit, a memory 1608 could also be implemented using at least one memory associated with the at least one transceiver and at least one separate memory associated with the at least one separate receiver, wherein the at least one memory and the at least one separate memory are capable of being separately powered on or off in order to facilitating power saving in accordance with various embodiments described herein As shown in FIG. 15B, the base station 1670 includes at least one processing unit 1650, at least one transceiver 1652, which includes functionality for a transmitter and a receiver, one or more antennas 1656, at least one memory 1658, and one or more input/output devices or interfaces 1666. A scheduler, which would be understood by one skilled in the art, is coupled to the processing unit 1650. The scheduler could be included within or operated separately from the base station 1670. The processing unit 1650 implements various processing operations of the base station 1670, such as signal coding, data processing, power control, input/output processing, or any other functionality. The processing unit 1650 can also support the methods and teachings described in more detail above. Each processing unit 1650 includes any suitable processing or computing device configured to perform one or more operations. Each processing unit 1650 could, for example, include a microprocessor, microcontroller, digital signal processor, field programmable gate array, or application specific integrated circuit.

Each transceiver 1652 includes any suitable structure for generating signals for wireless or wired transmission to one or more EDs or other devices. Each transceiver 1652 further includes any suitable structure for processing signals received wirelessly or by wire from one or more EDs or other devices. Although shown combined as a transceiver 1652, a transmitter and a receiver could be separate components. Each antenna 1656 includes any suitable structure for transmitting or receiving wireless or wired signals. While a common antenna 1656 is shown here as being coupled to the transceiver 1652, one or more antennas 1656 could be coupled to the transceiver(s) 1652, allowing separate antennas 1656 to be coupled to the transmitter and the receiver if equipped as separate components. Each memory 1658 includes any suitable volatile or non-volatile storage and retrieval device(s). Each input/output device 1666 facilitates interaction with a user or other devices (network communications) in the network. Each input/output device 1666 includes any suitable structure for providing information to or receiving information from a user, including network interface communications.

Figure 17:
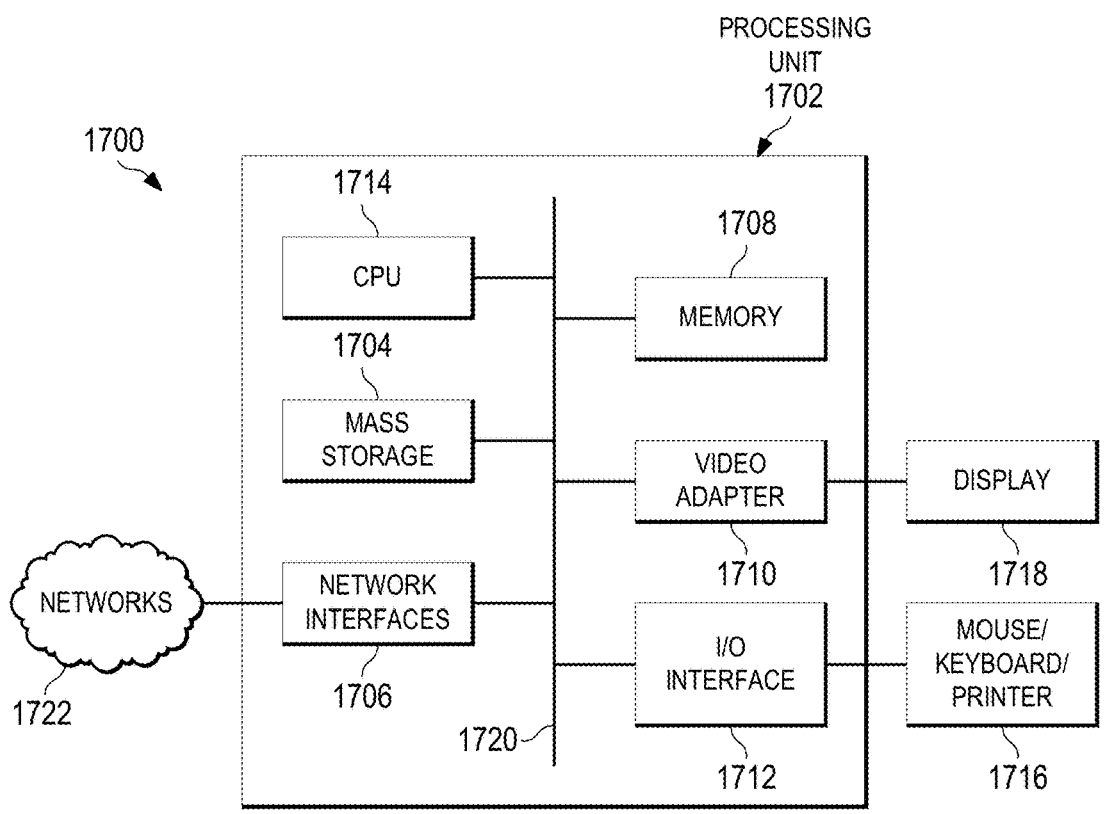
FIG. 17 illustrates a block diagram of a computing system that may be used for implementing the devices and methods disclosed herein.

FIG. 17 is a block diagram of a computing system 1700 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1700 includes a processing unit 1702. The processing unit includes a central processing unit (CPU) 1714, memory 1708, and may further include a mass storage device 1704, a video adapter 1710, and an I/O interface 1712 connected to a bus 1720.

The bus 1720 may be one or more of any type of several bus architectures including a memory bus or memory controller, a peripheral bus, or a video bus. The CPU 1714 may comprise any type of electronic data processor. The memory 1708 may comprise any type of non-transitory system memory such as static random access memory (SRAM), dynamic random access memory (DRAM), synchronous DRAM (SDRAM), read-only memory (ROM), or a combination thereof. In an embodiment, the memory 1708 may include ROM for use at boot-up, and DRAM for program and data storage for use while executing programs.

The mass storage 1704 may comprise any type of non-transitory storage device configured to store data, programs, and other information and to make the data, programs, and other information accessible via the bus 1720. The mass storage 1704 may comprise, for example, one or more of a solid state drive, hard disk drive, a magnetic disk drive, or an optical disk drive.

The video adapter 1710 and the I/O interface 1712 provide interfaces to couple external input and output devices to the processing unit 1702. As illustrated, examples of input and output devices include a display 1718 coupled to the video adapter 1710 and a mouse, keyboard, or printer 1716 coupled to the I/O interface 1712. Other devices may be coupled to the processing unit 1702, and additional or fewer interface cards may be utilized. For example, a serial interface such as Universal Serial Bus (USB) (not shown) may be used to provide an interface for an external device.

The processing unit 1702 also includes one or more network interfaces 1706, which may comprise wired links, such as an Ethernet cable, or wireless links to access nodes or different networks. The network interfaces 1706 allow the processing unit 1702 to communicate with remote units via the networks. For example, the network interfaces 1706 may provide wireless communication via one or more transmitters/transmit antennas and one or more receivers/receive antennas. In an embodiment, the processing unit 1702 is coupled to a local-area network 1722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a storing unit or module, a reporting unit or module, a detecting unit or module, or an entering unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A computer-implemented method for operating a station associated with an access node, the method comprising:
    receiving, by the station, a configuration message specifying a configuration;
    configuring, by the station and based on the configuration, the station to receive one or more wake-up radio (WUR) Beacons and report information about the one or more WUR Beacons, the configuration message including an identifier associated with the access node receiving, by the station, the one or more WUR Beacons, the one or more WUR beacons each comprising timing information and the identifier associated with the access node, and the station being configured to receive WUR Beacons with a WUR receiver; and reporting, by the station to the access node, the information about the one or more WUR Beacons, the information comprising at least one of second timing information, signal quality information, or error information.

2. The method of claim 1, wherein the configuration message further includes at least one of: an operating band where the one or more WUR Beacons are transmitted, an operating channel where the one or more WUR Beacons are transmitted, a monitoring time, a monitoring duration, a monitoring start time, a monitoring stop time, a reporting time, a reporting frequency, a reporting interval, an event that triggers a report, or a maximal number of WUR Beacons to be reported.

3. The method of claim 1, further comprising transmitting, by the station in response to receiving the configuration message, a response message including information conveying that the station accepts the configuration.

4. The method of claim 1, wherein the information about the one or more WUR Beacons comprises at least one of: first timer values obtained from second timer values included in the one or more WUR Beacons, third timer values obtained from a timer of the station when the one or more WUR Beacons are received, respectively, reception time interval values for reception time intervals between consecutive WUR Beacons of the one or more WUR Beacons, signal quality measures associated with the one or more WUR Beacons, or an error indication conveying that the one or more WUR Beacons are erroneous WUR Beacons.

5. The method of claim 4, wherein the first timer values and the second timer values are the same.

6. The method of claim 4, wherein the first timer values are the second timer values appended with one or more higher significant bits above bits associated with the second timer values, the one or more higher significant bits are obtained from the timer of the station and adjusted when an occurrence of a roll over in a second timer value is detected by the station.

7. The method of claim 4, further comprising determining, by the station, the reception time interval values for the one or more WUR Beacons in accordance with the third timer values associated with respective consecutive WUR Beacons of the one or more WUR Beacons.

8. The method of claim 4, further comprising measuring, by the station, the signal quality of the one or more WUR Beacons, wherein a signal quality measure comprises at least one of a received signal strength indication (RSSI), a signal to noise ratio (SNR), or a signal to noise plus interference ratio (SINR).

9. The method of claim 4, wherein the one or more WUR Beacons are erroneous WUR Beacons determined by the station, and wherein the method further comprises:

determining, by the station, that the one or more WUR Beacons are erroneous WUR Beacons in response to at least one of: detecting two or more equal second timer values included in the one or more WUR Beacons; detecting a difference between a reception time interval between a consecutive WUR Beacon pair of the one or more WUR Beacons and a transmission time interval between the consecutive WUR Beacon pair exceeding a first threshold, wherein the reception time interval is determined in accordance with the third timer values associated with the consecutive WUR Beacon pair, and wherein the transmission time interval is determined in accordance with the second timer values included in the consecutive WUR Beacon pair; or detecting a difference between a signal quality measure associated with the one or more WUR Beacons and signal quality measures associated with other received WUR Beacons identified by the identifier associated with the access node exceeding a second threshold, thereby producing the error indication conveying that the one or more WUR Beacons are erroneous WUR Beacons.

10. The method of claim 9, further comprising:

determining, by the station for each of the one or more WUR Beacons, an error type in accordance with the at least one of the detections associated with the each of the one or more WUR Beacons; and including, by the station, at least one of the error types associated with the one or more WUR Beacons or numbers conveying instances of respective error types associated with the one or more WUR Beacons in the error information reported to the access node.

11. The method of claim 1, further comprising receiving, by the station prior to reporting the information about the one or more WUR Beacons, a first frame requesting the reporting of the information about the one or more WUR Beacons.

12. A station comprising:

a memory storage comprising instructions; and one or more processors in communications with the memory storage, wherein the one or more processors execute the instructions to:

receive a configuration message specifying a configuration, configure, based on the configuration, the station to receive one or more wake-up (WUR) Beacons and report information about the one or more WUR Beacons, wherein the configuration message includes an identifier associated with an access node, receive the one or more WUR Beacons, wherein the one or more WUR beacons each comprises timing information and the identifier associated with the access node, and wherein the station is configured to receive WUR Beacons with a WUR receiver, and report, to the access node, the information about the one or more WUR Beacons, the information comprising at least one of second timing information, signal quality information, or error information.

13. The station of claim 12, wherein the one or more processors further execute the instructions to transmit, in response to receiving the configuration message, a response message including information conveying that the station accepts the configuration.

14. The station of claim 12, wherein the information about the one or more WUR Beacons comprises at least one of: first timer values obtained from second timer values included in the one or more WUR Beacons, third timer values obtained from a timer of the station when the one or more WUR Beacons are received, respectively, reception time interval values for reception time intervals between consecutive WUR Beacons of the one or more WUR Beacons, signal quality measures associated with the one or more WUR Beacons, or an error indication conveying that the one or more WUR Beacons are erroneous WUR Beacons.

15. The station of claim 14, wherein the one or more processors further execute the instructions to determine the reception time interval values for the one or more WUR Beacons in accordance with the third timer values associated with respective consecutive WUR Beacons of the one or more WUR Beacons.

16. The station of claim 14, wherein the one or more processors further execute the instructions to measure the signal quality of the one or more WUR Beacons, wherein a signal quality measure comprises at least one of a received signal strength indication (RSSI), a signal to noise ratio (SNR), or a signal to noise plus interference ratio (SINR).

17. The station of claim 14, wherein the one or more WUR Beacons are erroneous WUR Beacons determined by the station, and wherein the one or more processors further execute the instructions to determine that the one or more WUR Beacons are erroneous WUR Beacons in response to at least one of: two or more equal second timer values included in the one or more WUR Beacons are detected; a difference between a reception time interval between a consecutive WUR Beacon pair of the one or more WUR Beacons and a transmission time interval between the consecutive WUR Beacon pair exceeding a first threshold is detected, wherein the reception time interval is determined in accordance with the third timer values associated with the consecutive WUR Beacon pair, and wherein the transmission time interval is determined in accordance with the second timer values included in the consecutive WUR Beacon pair; or a difference between a signal quality measure associated with the one or more WUR Beacons and signal quality measures associated with other received WUR Beacons identified by the identifier associated with the access node exceeding a second threshold is detected, thereby producing the error indication conveying that the one or more WUR Beacons are erroneous WUR Beacons.

18. The station of claim 17, wherein the one or more processors further execute the instructions to determine, for each of the one or more WUR Beacons, an error type in accordance with the at least one of the detections associated with the each of the one or more WUR Beacons, and include at least one of the error types associated with the one or more WUR Beacons or numbers conveying instances of respective error types associated with the one or more WUR Beacons in the error information reported to the access node.

19. A computer-implemented method for operating an access node, the method comprising:
 transmitting, by the access node to a station, a configuration message specifying a configuration to configure the station to receive one or more first wake-up radio (WUR) Beacons and to report information about the one or more first WUR Beacons, the configuration message including an identifier associated with the access node;
 receiving, by the access node from the station associated with the access node, a report comprising the information about the one or more first WUR Beacons, the one or more first WUR Beacons being identified by the identifier associated with the access node, and the information about the one or more first WUR Beacons comprising at least one of timing information, signal quality information, or error information about the one or more first WUR Beacons;
 detecting, by the access node, an erroneous WUR Beacon in accordance with the received information about the one or more first WUR Beacons; and
 entering, by the access node, a secured operating mode in response to detecting the erroneous WUR Beacon.

20. The method of claim 19, wherein the configuration message further includes at least one of: an operating band where the one or more first WUR Beacons are transmitted, an operating channel where the one or more first WUR Beacons are transmitted, a monitoring time, a monitoring duration, a monitoring start time, a monitoring stop time, a reporting time, a reporting frequency, a reporting interval, an event that triggers a report, or a maximal number of WUR Beacons to be reported.

21. The method of claim 19, further comprising receiving, by the access node from the station, a response message including information conveying that the station accepts the configuration in the configuration message.

22. The method of claim 19, wherein the received information about the one or more first WUR Beacons comprises at least one of: first timer values obtained by the station from the one or more first WUR Beacons, second timer values obtained from a timer of the station when the one or more first WUR Beacons are received by the station, respectively, reception time interval values for reception time intervals between consecutive WUR Beacons of the one or more first WUR Beacons, signal quality measures associated with the one or more first WUR Beacons, or an error indication conveying that the one or more first WUR Beacons are erroneous WUR Beacons.

23. The method of claim 22, wherein detecting the erroneous WUR Beacon in accordance with the received information comprises detecting two or more equal reported first timer values in the received information.

24. The method of claim 22, further comprising:
 transmitting, by the access node, one or more second WUR Beacons including the identifier associated with the access node, each of the one or more second WUR Beacons further including a third timer value obtained from a timer of the access node when the each of the one or more second WUR Beacons is transmitted; and
 storing, by the access node, the third timer values of the one or more second WUR Beacons transmitted, wherein detecting the erroneous WUR Beacon in the received information comprises detecting a reported first timer value of a first WUR Beacon that doesn't match with any stored third timer values of the one or more second WUR Beacons.

25. The method of claim 24, wherein detecting the erroneous WUR Beacon in accordance with the received information comprises detecting a difference between a reception time interval between a consecutive first WUR Beacon pair and a transmission time interval between the same consecutive first WUR Beacon pair exceeding a threshold, the transmission time interval is determined in accordance with the stored third timer values associated with the consecutive first WUR Beacon pair.

26. The method of claim 25, further comprising determining, by the access node, the reception time intervals for the one or more first WUR Beacons in accordance with the second timer values associated with the one or more first WUR Beacons in the received information.

27. The method of claim 22, wherein detecting the erroneous WUR Beacon in accordance with the received information comprises detecting a difference between a signal quality measure associated with a first WUR Beacon reported and signal quality measures associated with other first WUR Beacons reported exceeding a threshold.

28. The method of claim 22, wherein detecting the erroneous WUR Beacon in accordance with the received information comprises detecting the error indication conveying that the one or more first WUR Beacons are erroneous WUR Beacons.

29. The method of claim 19, further comprising transmitting, by the access node to the station prior to receiving the information about the one or more first WUR Beacons, a first frame requesting a reporting of the information about the one or more first WUR Beacons.

30. An access node comprising:
a memory storage comprising instructions; and
one or more processors in communications with the memory storage, wherein the one or more processors execute the instructions to:
 transmit, to a station associated with the access node, a configuration message specifying a configuration to configure the station to receive one or more first wake-up radio (WUR) Beacons and to report information about the one or more first WUR Beacons, wherein the configuration message includes an identifier associated with the access node,
 receive, from the station, a report comprising the information about the one or more first WUR Beacons, wherein the one or more first WUR Beacons are identified by the identifier associated with the access node, and wherein the information about the one or more first WUR Beacons comprises at least one of timing information, signal quality information, or error information about the one or more first WUR Beacons,
 detect an erroneous WUR Beacon in accordance with the received information about the one or more first WUR Beacons, and
 enter a secured operating mode in response to detecting the erroneous WUR Beacon.

31. The access node of claim 30, wherein the one or more processors further execute the instructions to receive, from the station, a response message including information conveying that the station accepts the configuration in the configuration message.

32. The access node of claim 30, wherein the received information about the one or more first WUR Beacons comprises at least one of: first timer values obtained by the station from the one or more first WUR Beacons, second timer values obtained from a timer of the station when the one or more first WUR Beacons are received by the station, respectively, reception time interval values for reception time intervals between consecutive WUR Beacons of the one or more first WUR Beacons, signal quality measures associated with the one or more first WUR Beacons, or an error indication conveying that the one or more first WUR Beacons are erroneous WUR Beacons.

33. The access node of claim 32, wherein the one or more processors further execute the instructions to detect two or more equal reported first timer values in the received information.

34. The access node of claim 32, wherein the one or more processors further execute the instructions to transmit one or more second WUR Beacons including the identifier associated with the access node, each of the one or more second WUR Beacons further including a third timer value obtained from a timer of the access node when the each of the one or more second WUR Beacons is transmitted, and store the third timer values of the one or more second WUR Beacons transmitted, wherein detecting the erroneous WUR Beacon in the received information comprises detecting a reported first timer value of a first WUR Beacon that doesn't match with any stored third timer values of the one or more second WUR Beacons.

35. The access node of claim 34, wherein the one or more processors further execute the instructions to detect a difference between a reception time interval between a consecutive first WUR Beacon pair and a transmission time interval between the same consecutive first WUR Beacon pair exceeding a threshold, the transmission time interval is determined in accordance with the stored third timer values associated with the consecutive first WUR Beacon pair.

36. The access node of claim 35, wherein the one or more processors further execute the instructions to determine the reception time intervals for the one or more first WUR Beacons in accordance with the second timer values associated with the one or more first WUR Beacons in the received information.

37. The access node of claim 32, wherein the one or more processors further execute the instructions to detect a difference between a signal quality measure associated with a first WUR Beacon reported and signal quality measures associated with other first WUR Beacons reported exceeding a threshold.

38. The access node of claim 32, wherein the one or more processors further execute the instructions to detect the error indication conveying that the one or more first WUR Beacons are erroneous WUR Beacons.

* * * * *